(12) United States Patent
Liu

(10) Patent No.: US 11,724,714 B2
(45) Date of Patent: Aug. 15, 2023

(54) SYSTEMS AND METHODS FOR AUTONOMOUS VEHICLE STATE MANAGEMENT

(71) Applicant: Uber Technologies, Inc., San Francisco, CA (US)

(72) Inventor: Zelin Liu, Seattle, WA (US)

(73) Assignee: Uber Technologies, Inc., San Francisco, CA (US)

( * ) Notice: Subject to any disclaimer, the term of this patent is extended or adjusted under 35 U.S.C. 154(b) by 235 days.

(21) Appl. No.: 17/094,214

(22) Filed: Nov. 10, 2020

(65) Prior Publication Data

US 2022/0126858 A1   Apr. 28, 2022

Related U.S. Application Data

(60) Provisional application No. 63/106,626, filed on Oct. 28, 2020.

(51) Int. Cl.
*B60W 60/00* (2020.01)
*B60W 50/06* (2006.01)

(52) U.S. Cl.
CPC .......... *B60W 60/001* (2020.02); *B60W 50/06* (2013.01)

(58) Field of Classification Search
CPC ............................ B60W 60/001; B60W 50/06
See application file for complete search history.

(56) References Cited

U.S. PATENT DOCUMENTS 8,700,855 B2 * 4/2014 Revanuru ............... G06F 12/08
711/122

2017/0126810 A1 * 5/2017 Kentley ................ H04L 67/125
2018/0018508 A1 * 1/2018 Tusch ................ G06K 9/00335
(Continued)

FOREIGN PATENT DOCUMENTS

CN    109377326 A  *  2/2019  ............. G06F 21/44
WO    2022094086     5/2022

OTHER PUBLICATIONS

Thomas, S. "ML through Streaming at Lyft", May 2020 (Year: 2020).*

(Continued)

*Primary Examiner* — Elaine Gort
*Assistant Examiner* — Brittany Renee Peko
(74) *Attorney, Agent, or Firm* — Schwegman Lundberg & Woessner, P.A.

(57) ABSTRACT

Systems and methods for autonomous vehicle state management are provided. An offboard state service can obtain a vehicle command associated with changing an onboard-defined state of an autonomous vehicle. Data indicative of the command can be provided to a computing system onboard the autonomous vehicle. The onboard computing system can initiate a vehicle action in accordance with the command and provide a command response indicative of an updated vehicle status for the onboard-defined state to the state service. In response, the state service can update a current status for the onboard-defined state as represented by a vehicle profile corresponding to the autonomous vehicle. The state service can generate an update event indicative of the vehicle state and the updated current status and publish the update event to a distributed event stream such that a number of devices subscribed to the event stream can receive data indicative of the update event.

20 Claims, 10 Drawing Sheets

(56) References Cited

U.S. PATENT DOCUMENTS

2020/0033847 A1 1/2020 Way et al.
2021/0326777 A1* 10/2021 Stevens .................. G06Q 10/02

OTHER PUBLICATIONS

Apache Kafka, "Introduction", https://kafka.apache.org/intro, Retrieved on Nov. 9, 2020, 5 pages.
"International Application Serial No. PCT US2021 057060, International Search Report dated Feb. 14, 2022", 5 pgs.
"International Application Serial No. PCT US2021 057060, Written Opinion dated Feb. 14, 2022", 8 pgs.
"How to use remote features with FordPass Connect | Ford UK", Retrieved from the Internet:URL:https: web.archive.org web 20200930092932 https: www.ford.co.uk owner resources-and-support how-to-videos owner-services fordpass-remote-lock[retrieved on Feb. 2022], (Sep. 30, 2020), 3 pgs.

* cited by examiner

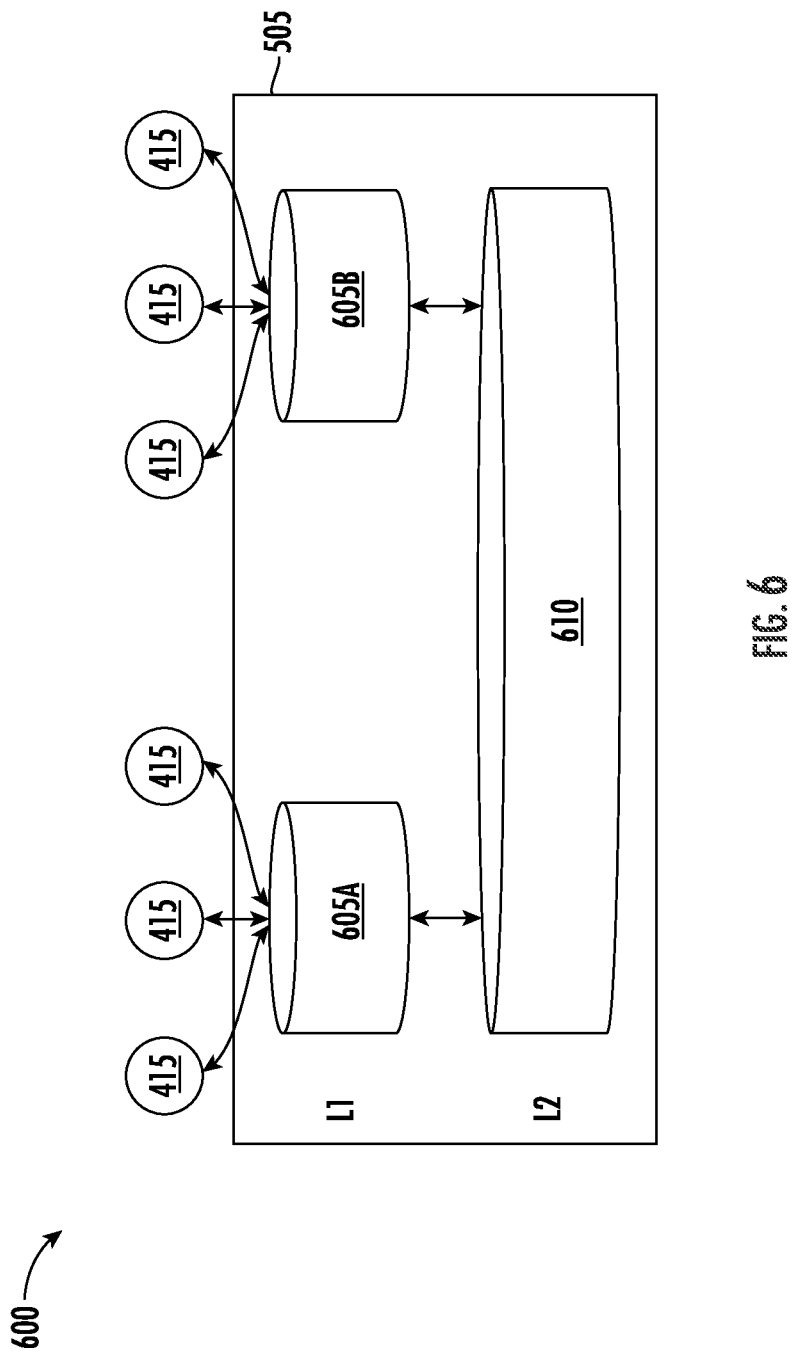

SYSTEMS AND METHODS FOR AUTONOMOUS VEHICLE STATE MANAGEMENT

RELATED APPLICATION

The present application is based on and claims benefit of U.S. Provisional Patent Application No. 61/106,626 having a filing date of Oct. 28, 2020, which is incorporated by reference herein.

FIELD

The present disclosure relates generally to vehicle services and, more particularly, to improved state management for autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of implementations of the present disclosure will be set forth in part in the following description, or may be learned from the description, or may be learned through practice of the implementations.

An example aspect of the present disclosure is directed to a computer-implemented method. The method includes obtaining a vehicle command associated with a vehicle state of an autonomous vehicle. The vehicle command includes a desired status for the vehicle state. The method includes determining that the desired status for the vehicle state is different than a current status of the vehicle state. The current status of the vehicle state is stored in a vehicle profile associated with the autonomous vehicle. The vehicle profile is indicative of a plurality of vehicle states of the autonomous vehicle. The method includes providing data indicative of the vehicle command to a vehicle computing system associated with the autonomous vehicle. The method includes obtaining a command response indicative of an updated vehicle status for the vehicle state. The method includes updating the current status of the vehicle state based, at least in part, on the command response. The method includes generating an update event indicative of the vehicle state and the updated current status. And, the method includes publishing the update event to a distributed event stream. One or more devices subscribed to the distributed event stream receive data indicative of the update event.

Another example aspect of the present disclosure is directed to a computing system. The computing system can include one or more processors and one or more tangible, non-transitory, computer readable media that collectively store instructions that when executed by the one or more processors cause the computing system to perform operations. The operations can include obtaining, via a state service from a remote device, a vehicle command associated with a vehicle state of an autonomous vehicle. The vehicle command includes a desired status for the vehicle state. The operations can include determining, via the state service, that the desired status for the vehicle state is different than a current status of the vehicle state. The current status of the vehicle state is stored in a vehicle profile associated with the autonomous vehicle. The operations can include providing, via the state service, data indicative of the vehicle command to a vehicle computing system associated with the autonomous vehicle. The operations can include obtaining, via the state service, a command response indicative of an updated vehicle status for the vehicle state. The operations can include updating, via the state service, the current status of the vehicle state based, at least in part, on the command response. The operations can include generating, via the state service, an update event indicative of the vehicle state and the updated current status. And, the operations can include publishing, via the state service, the update event to a distributed event stream. One or more devices subscribed to the distributed event stream are configured to receive data indicative of the update event.

Yet another example aspect of the present disclosure is directed to one or more tangible, non-transitory computer-readable media storing computer-readable instructions that when executed by one or more processors cause the one or more processors to perform operations. The operations can include obtaining a vehicle command associated with a vehicle state of an autonomous vehicle of a plurality of autonomous vehicles associated with a transportation service entity. The vehicle command can include a desired status for the vehicle state. The vehicle state can include a dynamic onboard-defined condition for the autonomous vehicle. The operations can include providing data indicative of the vehicle command to a vehicle computing system associated with the autonomous vehicle. The operations can include obtaining a command response indicative of an updated vehicle status for the vehicle state. The operations can include updating the current status of the vehicle state based, at least in part, on the command response. The operations can include generating an update event indicative of the vehicle state and the updated current status. And, the operations can include publishing the update event to a distributed event stream. One or more devices subscribed to the distributed event stream are configured to receive data indicative of the update event.

Other example aspects of the present disclosure are directed to other systems, methods, vehicles, apparatuses, tangible non-transitory computer-readable media, and the like for autonomous vehicle state management.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts an example storage infrastructure according to example embodiments of the present disclosure;

DETAILED DESCRIPTION

Figure 1:
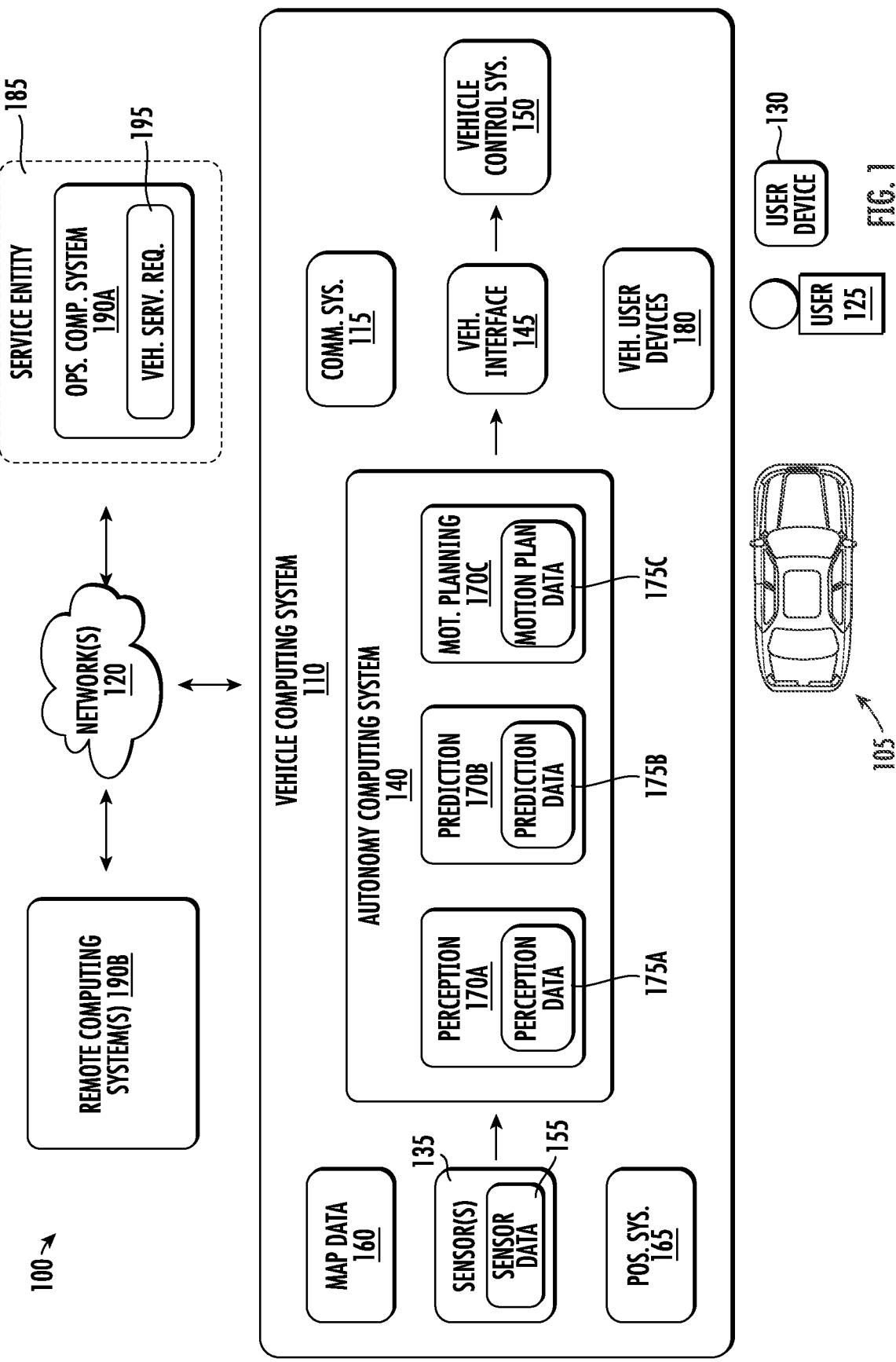
FIG. 1 depicts a block diagram of an example system for controlling the navigation of an autonomous vehicle according to example embodiments of the present disclosure.

Example aspects of the present disclosure are directed to improved state management for autonomous vehicles. For instance, the present disclosure describes a vehicle state service for initiating, verifying, storing, and distributing vehicle state changes across a number of autonomous vehicles. In particular, a computing system can include a vehicle state service configured to maintain current information (e.g., within a vehicle model) for a number of autonomous vehicles. The computing system can obtain a vehicle command (e.g., from a rider of an autonomous vehicle, a vehicle provider, a routing service, etc.) associated with a vehicle state of an autonomous vehicle. The vehicle command can include a desired status (e.g., locked, unlocked, etc.) for a dynamically defined state (e.g., a state of a vehicle component (e.g., door lock) that is set onboard the vehicle by a vehicle action (e.g., locking/unlocking action)) of the autonomous vehicle. The computing system can determine whether the desired status is different from a current status of the vehicle state as represented by a vehicle profile stored for the autonomous vehicle. The vehicle model, for example, can identify the current status of every dynamically defined vehicle state (e.g., door states, engine states, route states, climate control states, entertainment system states, etc.) for the respective autonomous vehicle.

In the event that the current status is different than the desired status, the computing system can provide the vehicle command to a vehicle computing system onboard the autonomous vehicle. The autonomous vehicle can receive the vehicle command, initiate the state change via one or more vehicle actions, and provide a command response indicative of an updated vehicle status to the computing system. The computing system can receive the updated vehicle status, update the current status of the vehicle state (e.g., as represented by the vehicle model) based on the updated vehicle status, and generate an update event indicative of the updated vehicle state. The update event can be published to a distributed event stream such that any device (e.g., rider device, service provider device, vehicle provider device, et.) subscribed to the distributed event stream can receive real time, event-based updates for the onboard states of the autonomous vehicle. In this manner, the computing system can distribute event-based updates to a number of devices interested in the state of an autonomous vehicle. By maintaining a vehicle model indicative of the current status of a number of dynamically, onboard-defined states, the technology of the present disclosure can reduce the number of vehicle commands provided to a vehicle to those that will result in a state change thereby reducing network traffic. In addition, the state service of the present disclosure can increase computer and vehicle security by updating a status of a vehicle after receiving a response from the vehicle verifying the update.

The following describes the technology of this disclosure within the context of autonomous vehicles for example purposes only. As described herein, the technology described herein is not limited to autonomous vehicles and can be implemented within other robotic and computing systems, such as those utilized by ridesharing and/or delivery services.

An autonomous vehicle (e.g., ground-based vehicle, aerial vehicles, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment. Additionally, the vehicle computing system can communicate with a remote computing system such as, for example, an operations computing system and/or one or more remote devices via a communication system onboard the vehicle. The operations computing system can be associated with a service entity that provides one or more vehicle services.

The operations computing system of a service entity can include various sub-systems/back-end software services that are configured to perform various functions. For example, the operations computing system can include one or more backend servers configured to host a plurality of backend software services for facilitating one or more transportation services. The plurality of backend software services can include a plurality of different services such as, for example, one or more trip assignment service(s), matching/deployment software service(s), routing service(s), supply positioning service(s), payment service(s), remote operator service(s), vehicle state service(s), and/or any other software service that can contribute to the provisioning of a transportation service. As examples, the matching/deployment software service(s) can be configured to receive data indicative of a user service request (e.g., from a service provider computing system, a user computing device, etc.) for a vehicle service, identify a plurality of candidate vehicles available to perform at least a portion of the vehicle route, etc. The routing software service(s) can be configured to determine the vehicle route based on the user service request. And, the trip assignment service(s) can be configured to assign the user service request to a candidate vehicle.

The operations computing system (and/or a backend service provided by the operations computing system) can communicate data indicative of the user service request to the candidate vehicle (e.g., directly and/or indirectly to the vehicles, etc.) or a vehicle provider associated with the candidate vehicle (e.g., service entity service provider, third-party service provider, etc.). The candidate vehicle and/or the vehicle provider can perform the requested transportation service by utilizing (e.g., via one or more requests for access to, etc.) one or more of the backend services provided by the operations computing system. In this manner, the operations computing system can be configured to facilitate a transportation service utilizing multiple service providers via a plurality of backend software services.

For example, the vehicles can include human-driven and/or autonomous vehicles of a vehicle provider. The vehicle providers can include the service entity (supplying "first party autonomous vehicles" or "service entity autonomous vehicles") and/or one or more third-party vehicle providers (supplying "third-party autonomous vehicles"). A third-party vehicle provider can be, for example, a third-party vehicle vendor, operator, manager, etc. that owns, operates, manages, etc. a fleet of third-party autonomous vehicles. In this regard, each of the one or more vehicle providers can be associated with one or more fleets of vehicles. The vehicle providers can make their fleets (or a portion of their fleets) of vehicles available (e.g., through the service entity, etc.) such that the vehicles are available for performing vehicle services (e.g., to address a user service request). Thus, each respective vehicle in the plurality of vehicles can be associated with at least one of the one or more fleets of vehicles associated with the one or more vehicle providers.

In this way, an autonomous vehicle involved in a transportation service can include one of a plurality of autonomous vehicles associated with the service entity. For instance, the plurality of autonomous vehicles associated with the transportation service can include the one or more service entity vehicles operated by the service entity and/or the one or more third-party vehicles operated by a third-party vehicle provider. The autonomous vehicle can include at least one of a service entity vehicle and/or a third-party vehicle. Each vehicle of the plurality of vehicles associated with the service entity can be associated with a number of states defined by the respective provider (e.g., service entity, third-party, etc.) of the vehicle. By way of example, the one or more service entity vehicles can be associated with one or more vehicle states configured by the service entity and/or the one or more third-party vehicles can be associated with one or more vehicle states configured by a respective third-party entity. In some implementations, a computing system associated with the third-party entity can provide data indicative of the one or more vehicle states to the service entity (e.g., its operations computing system) to help allow for implementation of the state service described herein with respect to third-party vehicles.

Each vehicle state can include a dynamic onboard-defined condition for an autonomous vehicle. More specifically, the vehicle state can include a particular dynamic onboard-defined condition that a vehicle is in at a specific time. Each vehicle state can include one or more different statuses indicative of the value of the vehicle state at the specific time. The status of a vehicle state can change over time due to one or more vehicle actions. A vehicle action can include an onboard vehicle action performed and/or initiated by a vehicle computing system of a respective vehicle (and/or a user of the vehicle). By way of example, a vehicle state can include a door state. The door state can be changed between a locked status (e.g., representing a locked door) and an unlocked status (e.g., representing an unlocked door). A vehicle action such as, for example, a locking action can be initiated by a respective vehicle computing system to change the status of the door state from the unlocked status to the locked status.

A vehicle state can be configured for any dynamic, onboard-defined condition of a vehicle. As further examples, a vehicle state can include a door state for each door, combination of doors, etc. of a vehicle, one or more engine states representing information (e.g., whether the engine is on, a current temperature of the engine, a working condition of the engine, etc.) associated with an engine of the vehicle, one or more routing states representing information (e.g., an onboard generated route, etc.) associated with a routing system (e.g., motion planning system, etc.) of the vehicle, one or more climate control states representing information (e.g., a current set temperature, etc.) associated with a climate control system of the vehicle, one or more entertainment states representing information (e.g., a current song playing, etc.) associated with an entertainment system of the vehicle, and/or any other states representing a dynamic condition of a vehicle. Each vehicle state can be changed between one or more different statuses such as, for example, a locked or unlocked status for the door state; an on, off, temperature range, etc. status for the engine state; a route status for the routing state; an environment condition status for the climate control state; an entertainment status for the entertainment state; etc.

The plurality of backend software services can be accessible to each of the vehicles, vehicle providers, service provider computing system, and/or any other device associated with the performance of a transportation service before, during, and/or after the performance of the transportation service to, for example, obtain and/or initiate a change to a current state of a vehicle. For example, the backend software services can be provided and maintained at one or more backend servers (e.g., of the operations computing system) configured to process a plurality of requests for access (e.g., from vehicles, vehicle providers, service provider computing systems, etc.) to the one or more of the software services. As discussed in further detail herein, the one or more backend servers can include one or more memory devices storing a plurality of vehicle profiles. Each vehicle profile can represent a current state of a vehicle associated with the service entity. For example, the current state can include a current status of each of a plurality of different vehicle states (e.g., associated with their respective vehicle component) for each vehicle associated with the service entity (e.g., service entity vehicles, third-party vehicles, etc.).

By way of example, each vehicle associated with the service entity (e.g., service entity vehicles, third-party vehicles, etc.) can be associated with a corresponding vehicle profile. The vehicle profile can identify a plurality of current statuses for a plurality of vehicle states of the vehicle. By way of example, the plurality of current statuses can include a current status for each vehicle state associated with a respective vehicle (e.g., configured by a respective vehicle provider). As discussed herein, the vehicle state can include a dynamically defined (e.g., set to a number of different values (e.g., statuses) over time) state of the vehicle. The dynamically defined state can be set based, at least in part, on one or more vehicle actions.

As an example, the plurality of vehicle states of a vehicle profile can include one or more door states indicative of a door status at a specific time, one or more engine states indicative of an engine status at a specific time, one or more route states indicative of a route status at a specific time, one or more climate control states indicative of a climate control status at a specific time, and/or one or more entertainment system states indicative of an entertainment status at a specific time. The plurality of current statuses for the plurality of vehicle states can include at least one of the door status, engine status, route status, climate control status, or entertainment status. For example, the door status can identify whether a door is locked, the engine status can identify whether an engine is running, the route status can identify a route that the autonomous vehicle is performing, the climate control status can identify an environment condition (e.g., temperature, etc.) of an interior of the autonomous vehicle, and the entertainment status can identify an entertainment activity (e.g., a song, video, directions, etc.) presented by an entertainment system of the autonomous vehicle.

In some implementations, the plurality of vehicle states can include one or more logical groupings. The one or more logical groupings can include one or more vehicle state categories as a top level categorization with one or more vehicle state domains within each of the vehicle state categories. The subfields of a vehicle state domain can describe attributes that are physically and/or logically close to each other, update in similar frequency (e.g., within a frequency time threshold, etc.), and/or can be consumed (e.g., retrieved) together by downstream systems. As one example, the vehicle state categories can include a hardware state category, motion state category, and/or a configuration state category. The hardware state category can include one or more vehicle states associated with one or more onboard hardware such as, for example, one or more door states, trunk states, seat states, engine states, communication system states, etc. The motion state category can include one or more vehicle states associated with vehicle motion such as, for example, one or more vehicle intention states, autonomy states, odometry states, planned route states, etc. The configuration state category can include one or more vehicle states associated with current onboard settings such as, for example, one or more entertainment system states, climate control states, etc.

The backend software services can include a vehicle state service configured to initiate, verify, store, and/or distribute vehicle state changes across each of the number of autonomous vehicles. In this way, a remote device (e.g., a user device, a rider device, a service provider device, etc.) can interact with the vehicle state service to request a vehicle state change (e.g., to unlock a door, to turn on an engine, etc.) for one or more vehicle(s) via one or more vehicle actions. A vehicle action, for example, can include an onboard bound instruction that is intended to mutate a vehicle state. As an example, a vehicle action can include an unlock door action configured to change the door state to an unlocked door status, an open fuel door action to change a fuel door state to an open status, an adjust climate control temperature action to change the set temperature identified by a climate control status of the climate control state, and/or any other action intended to change the status of any vehicle state of a respective vehicle.

The vehicle state service can be configured to preserve and serve service provider specific and provider agnostic vehicle states (e.g., described in detail herein) and facilitate state mutating vehicle actions. To do so, the vehicle state service can preserve (e.g., store, receive, maintain, etc.) vehicle profiles (e.g., vehicle state data models), accept updates (e.g., through one or more application programming interfaces, etc.) to the vehicle state profiles, and serve the vehicle state data through exposed interfaces (e.g., one or more application programming interfaces, a distributed event stream such as, for example, a kafka/heatpipe topic, etc.).

More particularly, the vehicle state service can include a gateway service and one or more worker instances. The gateway service can be configured to route data between the one or more worker instances of the vehicle state service and the one or more remote devices. For example, the vehicle state service can be configured with a stateful routing mechanism configured to distribute a plurality of vehicle commands to change a vehicle state between one or more of the worker instances. Callers of the vehicle state service can interact with the gateway service to provide a vehicle command. In some implementations, direct calls (e.g., a vehicle command) to an individual worker instance can be prohibited. The plurality of vehicle commands can be evenly distributed across one or more gateway instances and, from there, routed statefully to individual worker instances.

As one example, the vehicle commands can be distributed according to an associated vehicle identifier. For instance, a vehicle command can be associated with an autonomous vehicle that is one of a plurality of autonomous vehicles (e.g., service entity vehicles, third-party vehicles, etc.) associated with the service entity. The vehicle command, for example, can include a vehicle identifier corresponding to the autonomous vehicle. In addition, each worker instance of the one or more worker instances can be associated with a subset of one or more of the plurality of vehicles. In such a case, the vehicle command can be routed to an individual worker instance associated with a subset of vehicles including the vehicle associated with the vehicle command (e.g., identified by the vehicle identifier). By way of example, the vehicle state service can identify, via the gateway service, a vehicle identifier associated with the vehicle command and assign, via the gateway service, a worker instance of the one or more worker instances to the vehicle command based, at least in part, on the vehicle identifier. In this way, the vehicle commands for a respective vehicle can be synchronized (e.g., by a respective worker instance) with state change detection for the respective vehicle.

The vehicle state service can obtain a vehicle command associated with a vehicle state of an autonomous vehicle. The vehicle command can include a desired status for the vehicle state. By way of example, the vehicle command can be obtained from one or more remote devices associated with the autonomous vehicle. The remote device(s) can include, for example, one or more user device(s) associated with a rider of the autonomous vehicle (e.g., for a transportation service), maintenance device(s) associated with the servicing of the autonomous vehicle, service provider systems/devices, and/or any other device associated with a transportation service. The vehicle command can include a request to change the status of a vehicle state to the desired status.

In some implementations, the vehicle command can be associated with a command type. For example, the command type can include at least one of a first (e.g., service entity) command type and/or a second (e.g., provider agnostic) command type. The command type can correspond to a vehicle state and/or vehicle action associated with the vehicle command. By way of example, the vehicle state(s)

can include one or more first vehicle states of a first type (e.g., service entity type) and/or one or more second vehicle states of a second type (e.g., provider agnostic type). The second vehicle state(s) can include a common set of vehicle states that can be updated and retrieved by service entity vehicles and third-party vehicles. The first vehicle state(s) can include a set of vehicle states that can be updated and retrieved by service entity vehicles and/or one or more other groups of vehicles, but not every vehicle (e.g., service entity vehicles and third-party vehicles) associated with the service entity.

In some implementations, the vehicle states can be defined by one or more vehicle state application programming interface(s) (APIs) based, at least in part, on the vehicle state type. For example, the vehicle state API(s) can include at least a first (e.g., service entity) and second (e.g., provider agnostic) vehicle state API. By way of example, the first vehicle state API can include a service entity vehicle state API that defines private vehicle states for service entity vehicles. In addition, or alternatively, the second vehicle state API can include a provider agnostic vehicle state API that defines public vehicle states for both service entity vehicles and third-party vehicles. Each vehicle state can be defined by a respective application programming interface based on the vehicle state type. By way of example, the first vehicle state(s) can be defined by the first vehicle state API and the second vehicle state(s) can be defined by the second vehicle state API.

In some implementations, the first vehicle state API can be directly accessible to one or more service entity vehicles, whereas the second vehicle state API can be accessible to service entity vehicles and third-party vehicles. By way of example, the first and second vehicle APIs can be associated with one or more respective get and update APIs defining functions to obtain (e.g., via the get API) or set (e.g., via the update API) a current status of a vehicle state. In some implementations, the respective get and update APIs can be grouped by vehicle state category (e.g., one or more API directories for vehicle states of each vehicle state category). The get and update APIs can define one or more messages to obtain or set a status of a first or second vehicle state. For example, a first (e.g., service entity) get and update APIs can define one or more messages to obtain or set a status of the first vehicle state(s), whereas second (e.g., provider agnostic) get and update APIs can define one or more messages to obtain or set a status of the second vehicle state(s). In some implementations, remote devices can interact with a respective get and/or update API (e.g., call a function of, etc.) to obtain or set a current status of a respective vehicle state.

A service entity vehicle can be accessible via one or more calls to the first (e.g., service entity) application programming interfaces or the second (e.g., provider agnostic) application programming interfaces. A third-party vehicle can be accessible via one or more calls to the second (e.g., provider agnostic) application programming interface. A vehicle state type of a vehicle state can be promoted (e.g., from a first vehicle state to a second vehicle state) or demoted (e.g., from a second vehicle state to a first vehicle state) by moving the location of the vehicle state definition. For example, a first vehicle state can be promoted to a second vehicle state by appending the respective vehicle state definition to the second vehicle state API and/or removing the definition from the first vehicle state API. In this manner, the multiple APIs can enable the promotion and/or demotion (and/or the corresponding accessibility) of a plurality of vehicle states with small code changes (e.g., to consume from a different path for the same definition).

In some implementations, the vehicle actions (e.g., an action by a vehicle to change a vehicle state of the vehicle) can include one or more first vehicle actions of a first type (e.g., service entity type) and/or one or more second vehicle actions of a second type (e.g., provider agnostic type). The first vehicle action(s) can correspond to a first vehicle state such that the first vehicle action(s) can be issued to both service entity and third-party vehicles, whereas the second vehicle action(s) can correspond to a second vehicle state such that the second vehicle action(s) can be issued to service entity vehicles and/or one or more other groups of vehicles, but not every vehicle (e.g., service entity vehicles and third-party vehicles) associated with the service entity.

The vehicle actions can be defined by a vehicle action API. Each vehicle action can include a command subroutine to initiate a vehicle action (e.g., by interacting with an autonomous vehicle computing system) and a corresponding update subroutine to update an associated vehicle state (e.g., based on the success of the command subroutine). The vehicle action API can be configured to interact with the first and/or second application programming interfaces. For instance, the command and/or update subroutines can include one or more calls to at least one of the first (e.g., service entity) application programming interface or the second (provider agnostic) application programming interface.

A vehicle command can be associated with a command type. The command type can include a first command type or a second command type. The first command type can be associated with a vehicle action, defined by the action API, that includes at least one call to the first (e.g., service entity) APIs, for example, to initiate a state change to at least one first vehicle state. In addition, or alternatively, the second command type can be associated with a second vehicle action, defined by the action API, that includes at least one call to the second (e.g., provider agnostic) APIs, for example, to initiate a state change to at least one second vehicle state. The type of a vehicle action and/or vehicle command can be modifiable by changing a location of the at least one call corresponding the action/command. In this manner, each vehicle action defined by the vehicle action API and/or corresponding vehicle command can be associated with at least one of the first or second application programming interfaces.

The vehicle state service can determine whether the desired status for the vehicle state is different than a current status of the vehicle state. For example, as described herein, each vehicle of the plurality of vehicles can be associated with a corresponding vehicle profile describing the current state of the vehicle. The current status of the vehicle state of the autonomous vehicle associated with the vehicle command can be stored in the vehicle profile associated with the autonomous vehicle. The vehicle state service can obtain the vehicle profile associated with the autonomous vehicle to compare the desired status of the vehicle state to the current status of the vehicle state.

By way of example, the vehicle state service (e.g., a worker instance of the vehicle state service) can be configured to access the vehicle profile from a two level cache based, at least in part, on the vehicle identifier associated with the vehicle command. For example, the operational system can include a storage system including one or more memory devices. The storage system can include a two-tiered storage architecture. The two-tiered storage architecture can include a multi-level cache (e.g., a two level cache). The multi-level cache can include a two level cache including at least one distributed, in memory key-value database.

More particularly, the multi-level cache can include a first level cache and second level cache. The first level cache can include a distributed, in memory key-value data structure such that it is highly performant and consistent with a datacenter. Underneath, a durable second level cache can be configured to ensure the propagation of vehicle state data across a number of datacenters. In this manner, the vehicle state data (e.g., vehicle profiles, etc.) can be protected from datacenter failover scenarios. For inbound vehicle state updates (e.g., in response to vehicle commands), quick diffing can be performed (e.g., by the worker instance) with the first level cache. The worker instance can compare the desired status to the current status of the diffed vehicle profile (and/or vehicle state) to determine whether to update the status of the vehicle state. The worker instance can determine to update the status of the vehicle state in the event that the current status is different than the desired status for the vehicle state.

If an update is determined after diffing, the worker instance can update (e.g., after receiving a vehicle response) the first and second level cache in serial. In some implementations, an inbound handler can respond after an update to the first level cache is complete, and monitor update failures to the second level cache. In addition, or alternatively, the inboard handler can include a time to live threshold (e.g., minute, hour, eight hours, etc.) for the first level cache to minimize effects of the first and second level caches being out of sync. For inbound current state requests (e.g., request to obtain the current status of a vehicle state), the worker instance can attempt to look up requested vehicle state from level one cache. In the event the requested vehicle state (e.g., of the respective vehicle profile) is not found, the worker instance can attempt to warm up the level one cache with data fetched from the level two cache and attempt to fulfill the current state request.

The vehicle state service can determine that the desired status for the vehicle state is different than the current status of the vehicle state. In response, the vehicle state service (e.g., via the gateway service) can provide data indicative of the vehicle command to a vehicle computing system associated with the autonomous vehicle. In some implementations, the data indicative of the vehicle command can be provided to the vehicle via one or more application programming interfaces. For example, as described herein, the vehicle command can be associated with at least one command type corresponding to at least one call to a first (e.g., service entity) or second (e.g., provider agnostic) application programming interface. The vehicle command type of the vehicle command (e.g., the associated vehicle action) can correspond to at least one of the application programming interfaces based, at least in part, on the vehicle state and/or vehicle action associated with the vehicle command.

By way of example, the vehicle command can correspond to a respective vehicle action defined by the vehicle action API. The respective vehicle action can include one or more calls to at least one of the first or second vehicle state APIs, for example, to change a first or second vehicle state. As discussed herein, each API can include a plurality of calls of a certain type. For instance, the first (e.g., service entity) API can include a plurality of calls of a first (e.g., service entity) type. Each of the calls can be associated with a first vehicle action, as defined by the vehicle action API, that corresponds to a vehicle command of a first command type. The second (e.g., provider agnostic) API can include a plurality of calls of a second (e.g., provider agnostic) type. Each of the calls can be associated with a second vehicle action, as defined by the vehicle action API, that corresponds to a vehicle command of a second type.

In some implementations, a service entity vehicle can be accessible via one or more calls to the first (e.g., service entity) or second (e.g., provider agnostic) APIs. In addition, or alternately, a third-party vehicle can be accessible via one or more calls to the second (e.g., provider agnostic) API. In such a case, the vehicle state service can determine an application programming interface for providing the command (and/or data thereof) to the vehicle computing system based on the command type. The vehicle state service can provide, via the respective application programming interface, the data indicative of the vehicle command to the vehicle computing system. For example, the vehicle state service can provide the data indicative of the vehicle command, via one or more calls to the first application programming interface(s), directly to a device (e.g., vehicle computing system, service entity platform device, etc.) associated with a service entity vehicle in the event that the vehicle command is a first (e.g., service entity) command type. In addition, or alternatively, the vehicle state service can provide the data indicative of the vehicle command, via one or more calls to the second application programming interface(s), to a device (e.g., vehicle computing system, service entity platform device, third-party platform device, etc.) associated with the service entity and/or third-party vehicle through a backend gateway platform in the event that the vehicle command is a second (e.g., provider agnostic) command type.

The autonomous vehicle (e.g., vehicle computing device, etc.) can obtain the data indicative of the vehicle command. In response, the vehicle can initiate an action to change the status of the vehicle state to the desired status. For example, a vehicle computing system can provide one or more onboard instructions to one or more onboard components (e.g., door, entertainment system, engine, etc.) of the vehicle to initiate a requested state change. This can include, for example, providing one or more instructions to a door component to initiate a door locking action to lock a door of the vehicle, one or more instructions to an engine component to initiate a turning off action to turn off the engine, etc. After the action is completed, the autonomous vehicle (e.g., and/or vehicle computing system thereof) can provide a command response indicative of the updated vehicle status (e.g., the performance of the requested vehicle action, etc.) to the vehicle state service.

The vehicle state service can obtain the command response indicative of the updated vehicle status for the vehicle state. In response, the vehicle state service can update the current status of the respective vehicle state (e.g., of the respective vehicle profile) based on the command response. For instance, the command response can identify an updated status of the vehicle state. In such a case, the vehicle state service can update the current status of the respective vehicle state to the update status of the vehicle state. In this manner, the vehicle state service can wait for a confirmation of a vehicle state change from the vehicle before updating the current status of the vehicle state.

A call to a vehicle action from the vehicle action APIs can, in some implementations, not be guaranteed to be deterministic. For example, a caller (e.g., vehicle state service) may not assume a pre-state of a vehicle action's targeting vehicle state (e.g., due to latency, etc.). In addition, the caller (e.g., vehicle state service) may not assume the targeting vehicle will perform the vehicle action effectively. Thus, in order to increase security and verify the effectiveness of a vehicle action, vehicle commands issued to a vehicle can include a request for a vehicle command response. The command response can include an indication of a clear success or failure of the requested vehicle actions that signals the effectiveness of the requested vehicle action.

As an example, a vehicle command including a desired vehicle status for a vehicle state that is the same as the current vehicle status can immediately result in a successful command response (e.g., because no action is required). As another example, a vehicle command including a desired vehicle status different than the current vehicle status can result in a success after the desired status is reflected onboard the vehicle (e.g., as indicated by a command response). As yet another example, the vehicle command including a desired vehicle status different than the current vehicle status can result in an error response after a time threshold elapses without the desired status being reflected on/offboard (e.g., by receiving a successful command response). Moreover, in the case of multiple competing vehicle commands, the API calls will only respond based on the next immediate state change such that the vehicle action API is immediate outcome-oriented. In this manner, multiple vehicle commands aiming to set the vehicle status of a vehicle to a same status can result in success after the desired status is reflected on/offboard (e.g., by a command response to at least one of the vehicle commands). As yet another example, multiple vehicle commands that aim to set a vehicle state to one or more different values can result in success or failure based on the immediate state change detected offboard.

The vehicle state service can generate an update event indicative of the vehicle state and the updated current status. The update event can be published to a distributed event stream (e.g., a kafka/heatpipe topic, etc.). For example, the worker instance can be configured to publish the update event to the distributed event stream in response to the command response. A vehicle state message (e.g., indicative of the update event) can be streamed through the distributed event stream. In some implementations, the distributed event stream can include one or more topics. In such a case, the stream can include at least one topic for each vehicle state domain. Each topic can include both first and second vehicle states (e.g., as defined by the first (e.g., service entity) and second (provider agnostic) APIs).

One or more devices can be subscribed to the distributed event stream to receive data indicative of an update event for one or more vehicles. By way of example, the one or more devices subscribed to the distributed event stream can include at least one of a user device, a service entity device, a vehicle provider device and/or any other device associated with an on-demand transportation service. The distributed event stream can fire on-update. In this manner, each of the subscribed devices can receive event-based notifications of a change in a vehicle state. In some implementations, updates to the first and second vehicle states can be divided between separate sub-messages. In this way, the consumers (e.g., subscribed devices) can subscribe to receive vehicle state changes for specific types of vehicle state(s) (e.g., service entity type states or provider agnostic types states) of a domain without having to manage multiple subscriptions.

The systems and methods described herein provide a number of technical effects and benefits. For instance, the computing system can include a number of different APIs to differentiate between service provider specific vehicle states and vehicle provider agnostic vehicle states. A vehicle action API can differentiate between a service provider specific and vehicle provider agnostic action based on the different APIs. This can improve autonomous vehicle operations by tailoring the delivery of vehicle action requests to an associated vehicle. In addition, the systems and methods described herein provide for an offboard vehicle state service that preserves and serves both first party specific and vehicle provider agnostic vehicle states (e.g., and statuses thereof), and facilitates vehicle state mutating actions (e.g., vehicle commands). The vehicle state service provides a comprehensive service and interfaces for fetching updates to vehicle states in real-time. Advantageously, the service can make data (e.g., state data stored in vehicle profile) centrally available through an off-board backend ecosystem to third-party vehicle providers. This, in turn, can increase the integrity of vehicle state data, while at the same time reducing network congestion induced by a number of state requests from vehicle providers to individual vehicles. In addition, the distributed event stream of the vehicle state service gives consumers (e.g., vehicle provider, users, riders, etc.) the freedom to pick and choose (e.g., via subscriptions) vehicles states to consume thereby minimizing unnecessary firing of vehicle state updates to uninterested devices. Moreover, the event driven streaming interfaces and highly performant fetch interfaces empower downstream consumer services to remain stateless. In this manner, the systems and method described herein can improve computing systems, in general, by reducing storage requirements, bandwidth usage, and data processing demands across a plurality of devices and services involved in transportation services.

Example aspects of the present disclosure can provide a number of improvements to computing technology such as, for example, autonomous vehicle and/or ridesharing computing technology. For instance, the systems and methods of the present disclosure can provide an improved approach for vehicle state maintenance. For example, a system can obtain a vehicle command associated with a vehicle state of an autonomous vehicle. The vehicle command can include a desired status for the vehicle state. The computing system can determine that the desired status for the vehicle state is different than a current status of the vehicle state. For instance, the current status of the vehicle state can be stored in a vehicle profile associated with the autonomous vehicle. The vehicle profile can be indicative of a plurality of vehicle states of the autonomous vehicle. The computing system can provide data indicative of the vehicle command to a vehicle computing system associated with the autonomous vehicle. The computing system can obtain a command response indicative of an updated vehicle status for the vehicle state. The computing system can update the current status of the vehicle state based, at least in part, on the command response. The computing system can generate an update event indicative of the vehicle state and the updated current status. And, the computing system can publish the update event to a distributed event stream. One or more devices subscribed to the distributed event stream can receive data indicative of the update event.

In this manner, the computing system can employ improved state servicing techniques to preserve vehicle state of various types and selectively service a plurality of state changes across a plurality of devices and autonomous vehicles associated with a transportation service. To this end, the computing system can accumulate and utilize newly available information such as, for example, different vehicle state APIs, vehicle profiles storing states defined by the different vehicle APIs, and distributed event stream messages. The APIs can be uniquely tailored to vehicle states corresponding to a service provider or a third-party vehicle provider. Moreover, subscriptions to the distributed event stream can enable the computing system to distribute state changes to interested devices on an event-driven basis. In this way, the computing system provides a practical application that reduces bandwidth constraints on the delivery vehicle state changes across a plurality of devices and vehicles involved in a transportation service.

With reference now to FIGS. 1-10, example implementations of the present disclosure will be discussed in further detail. FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be any other type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems (e.g., a state service, etc.), initiating a vehicle command (e.g., by performing a vehicle action to cause a vehicle state change, etc.), etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or stored onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein, for example, to maintain and/or initiate a status change to an onboard-defined vehicle state, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
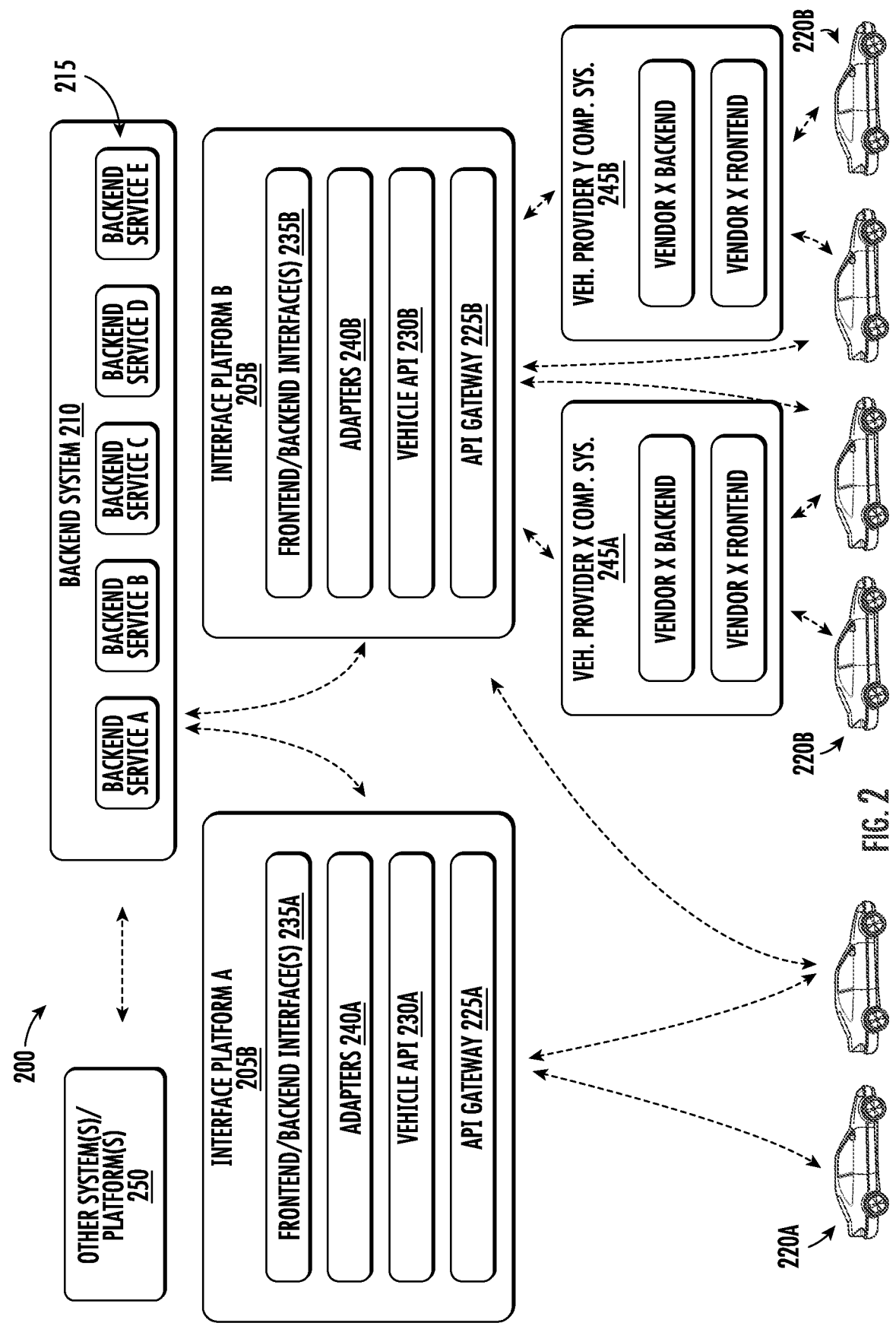
FIG. 2 depicts an example infrastructure system according to example embodiments of the present disclosure.

For example, FIG. 2 depicts an example service infrastructure 200 according to example implementations of the present disclosure. The service infrastructure 200 can include one or more systems, interfaces, and/or other components that can be included in an operations computing systems (e.g., operations computing system 190A) of the service entity (e.g., service entity 185) for coordinating vehicle services and managing/supporting the autonomous vehicle (e.g., autonomous vehicle 105) associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface application platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can be utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help return an associated response. The first API gateway 225A can help provide other support functions for the service infrastructure 200 such as, for example, authentication functions, etc.

The first application programming interface platform 205A can include one or more APIs such as, for example, a first vehicle API 230A. The first vehicle API 230A can include a library and/or parameters for facilitating communications between the first party autonomous vehicles 220A and the backend service(s) 215 of the backend system 210. For example, the first vehicle API 230A can be called by a first party autonomous vehicle 220A and/or another system to help communicate data, messages, etc. to and/or from an autonomous vehicle. The first vehicle API 230A can provide for communicating such information in a secure, bidirectional manner that allows for expanded processing of data offboard a vehicle, analyzing such data in real time, and/or the like. In some implementations, the first vehicle API 230A can include one or more API(s) such as, for example, a first vehicle state API. The first API 230A may be referred to herein as a service entity API.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A to communicate with the backend system 215 (and vice versa) so that a particular backend service can be accessed by a particular first party autonomous vehicle 220A. The frontend/backend interface(s) 235A can, for example, a provide a secure tunnel for the first party autonomous vehicles 220A to communicate with a backend vehicle state service.

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., first vehicle API 230A, first vehicle state API, etc.). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles 220A, 220B of a third-party vehicle provider and/or the service entity vehicle provider. As described herein, a third-party vehicle provider can be an entity that makes one or more of its autonomous vehicles available to the service entity for the provision of vehicle services. This can include, for example, an individual, an original equipment manufacturer (OEM), a third-party vendor, or another entity that places autonomous vehicle(s) online with the service platform of the service entity such that the autonomous vehicle(s) can provide vehicle services of the service entity. These autonomous vehicles may be referred to as "third-party autonomous vehicles" and are shown in FIG. 2 as third-party autonomous vehicles 220B. Even though such autonomous vehicles may not be included in the fleet of autonomous vehicles of the service entity, the service infrastructure 200 (e.g., of the service entity's service platform, etc.) can allow the third-party autonomous vehicles 220B to provide vehicle services offered by the service entity, access one or more backend services 215 of the backend system 210, etc.

The second application programming interface platform 205B can allow the service platform to communicate directly or indirectly with autonomous vehicle(s) 220A, 220B. In some implementations, a third-party autonomous vehicle 220B and/or service entity autonomous vehicles 220A may call an API of, send data/message(s) to, receive data/message(s) from/directly through, etc. the second application programming interface platform 205B.

Additionally, or alternatively, another computing system can serve as an intermediary between the third-party autonomous vehicles 220B and the second application programming interface platform 205B (and the service platform associated therewith). For example, the service infrastructure 200 can be associated with and/or in communication with one or more third-party vehicle provider computing systems 245, such as a vehicle provider X computing system 245A and a vehicle provider Y computing system 245B. Each third-party vehicle provider X, Y can have its own, separate third-party autonomous fleet including respective third-party autonomous vehicles 220B. The third-party vehicle provider computing systems 245 can be distinct and remote from the service infrastructure 200 and provide for management of vehicles associated with that particular third-party vehicle provider. As shown in FIG. 2, a third-party vehicle provider computing system 245 can include its own backends and/or frontends for communicating with other systems (e.g., third-party autonomous vehicle(s) 220B, operations computing system, etc.).

The third-party computing system(s) 245A-B associated with a particular third-party autonomous vehicle fleet can serve as the communication intermediary for that fleet. For example, third-party autonomous vehicles 220B associated with third-party vehicle provider X can communicate with the third-party vehicle provider X computing system 245A which can then communicate with the service infrastructure 200 (e.g., to access the available backend services 215) via the second application programming interface platform 205B.

Data from the service infrastructure 200 (e.g., the backend services 215) can be communicated to the vehicle provider X computing system 245A (e.g., via the second application programming interface platform 205B) and then to the third-party autonomous vehicles 220B associated with third-party vehicle provider X. In another example, third-party autonomous vehicles 220B associated with third-party vehicle provider Y can communicate with the third-party vehicle provider Y computing system 245B which can then communicate with the service infrastructure 200 (e.g., to access the available backend services 215) via the second application programming interface platform 205B. Data from the service infrastructure 200 (e.g., the backend services 215) can be communicated to the third-party vehicle provider Y computing system 245B (e.g., via the second application programming interface platform 205B) and then to the third-party autonomous vehicles 220B associated with third-party vehicle provider Y.

The second application programming interface platform 205B can include a number of components to help facilitate the support, coordination, and management of the third-party autonomous vehicles 220B associated with the third-party vehicle providers. The second application programming interface platform 205B can provide access to one or more backend services 215 that are available to the third-party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc.

The second application programming interface platform 205B can include one or more APIs such as, for example, a second vehicle API 230B. The second vehicle API 230B can include a library and/or parameters for facilitating communications between the third-party autonomous vehicles 220B and the backend service(s) 215 of the backend system 210. For example, the second vehicle API 230B can be called by a third-party autonomous vehicle 220B and/or another system (e.g., a third-party vehicle provider computing system 245, etc.) to help communicate data, messages, etc. to and/or from an autonomous vehicle and/or other system. The second vehicle API 230B can provide for communicating such information in a secure, bidirectional manner. In some implementations, the second vehicle API 230B can include one or more API(s) such as, for example, a second vehicle state API. The second API 230B may be referred to herein as a provider agnostic API.

The second application programming interface platform 205B can include second frontend/backend interface(s) 235B. Each of the second frontend/backend interface(s) 235B can be associated with a backend service 215 of the backend system 210. The second frontend/backend interface(s) 235B can serve as interface(s) for one client (e.g., an external client such as a third-party autonomous vehicle 220B, a third-party vehicle provider computing system 245) to provide data to another client (e.g., a backend service 215). In this way, the second frontend/backend interface(s) 235B can be external facing edge(s) of the second application programing interface platform 205B that are responsible for providing secure tunnel(s) for third-party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., second vehicle API 230B, second vehicle state API, etc.).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220A.

In some implementations, the service infrastructure 200 can facilitate communication between the service platform and one or more other system(s)/platform(s) 250 of the service entity/operations computing system. By way of example, the service entity may have (e.g., the operations computing system may include, etc.) one or more other system(s)/platform(s) 250 for facilitating one or more vehicle and/or vehicle services. By way of example, the other system(s)/platform(s) 250 can include a system configured to indicate one or more services/vehicles that are available to a user and/or other system. As another example, the other system(s)/platform(s) 250 can include a system configured to coordinate the provision of vehicle services by human-driven vehicles and/or vehicle services that are specifically associated with certain types of services (e.g., delivery services, aerial transport services, etc.). The other system(s)/platform(s) 250 may communicate with the service platform utilizing the service infrastructure 200 to determine, for example, whether any autonomous vehicles would be available to a user for any potential vehicle services.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles and/or the third-party vehicle providers performing/providing those vehicle service(s). The backend software service(s) 215 can include a plurality of different services such as, for example, one or more trip assignment service(s), matching/deployment software service(s), routing service(s), supply positioning service(s), payment service(s), remote operator service(s), vehicle state service(s), and/or any other software service that can contribute to the provisioning of a transportation service.

By way of example, the backend software services 215 accessible to the autonomous vehicles during the performance of a vehicle service can include supply positioning service(s) to route the vehicle to a location (e.g., an expected high density area, etc.) after/before a vehicle service, payment service(s) (e.g., to process payments for the vehicle service), remote assistance/operator service(s) (e.g., to control the vehicle in one or more potentially hazardous circumstances, etc.), and/or any other software service that can contribute to the performance of a vehicle service. As another example, the backend software services 215 accessible to a service provider computing system (e.g., the service entity, the vehicle providers 245A, 245B, the other system(s)/platform(s) 250, etc.) before the performance of a vehicle service can include a matching service, an itinerary service, and/or any other software service that can contribute to the scheduling/assignment of the vehicle service. The backend software services can be provided and maintained at backend system 210 (e.g., of the operations computing system 104) configured to process a plurality of requests for access (e.g., from user device, vehicles, vehicle providers, service provider computing systems, etc.) to one or more of the software services. In some cases, the requests can include a vehicle command associated with a vehicle state of an autonomous vehicle 220A, 220B.

For instance, the backend software service(s) 215 can include a vehicle state service configured to initiate, verify, store, and/or distribute vehicle state changes across each of the autonomous vehicles 220A, 220B. The backend service(s) 215 (e.g., the vehicle state service) can be accessible to each of the vehicles 220A, 220B, vehicle provider computing system(s) 245 associated with the vehicles 220B, and/or any other device (e.g., a user device, etc.) associated with the performance of a transportation service before, during, and/or after the performance of the transportation service to, for example, obtain and/or initiate a change to a current state of a vehicle 220A, 220B.

Figure 3:
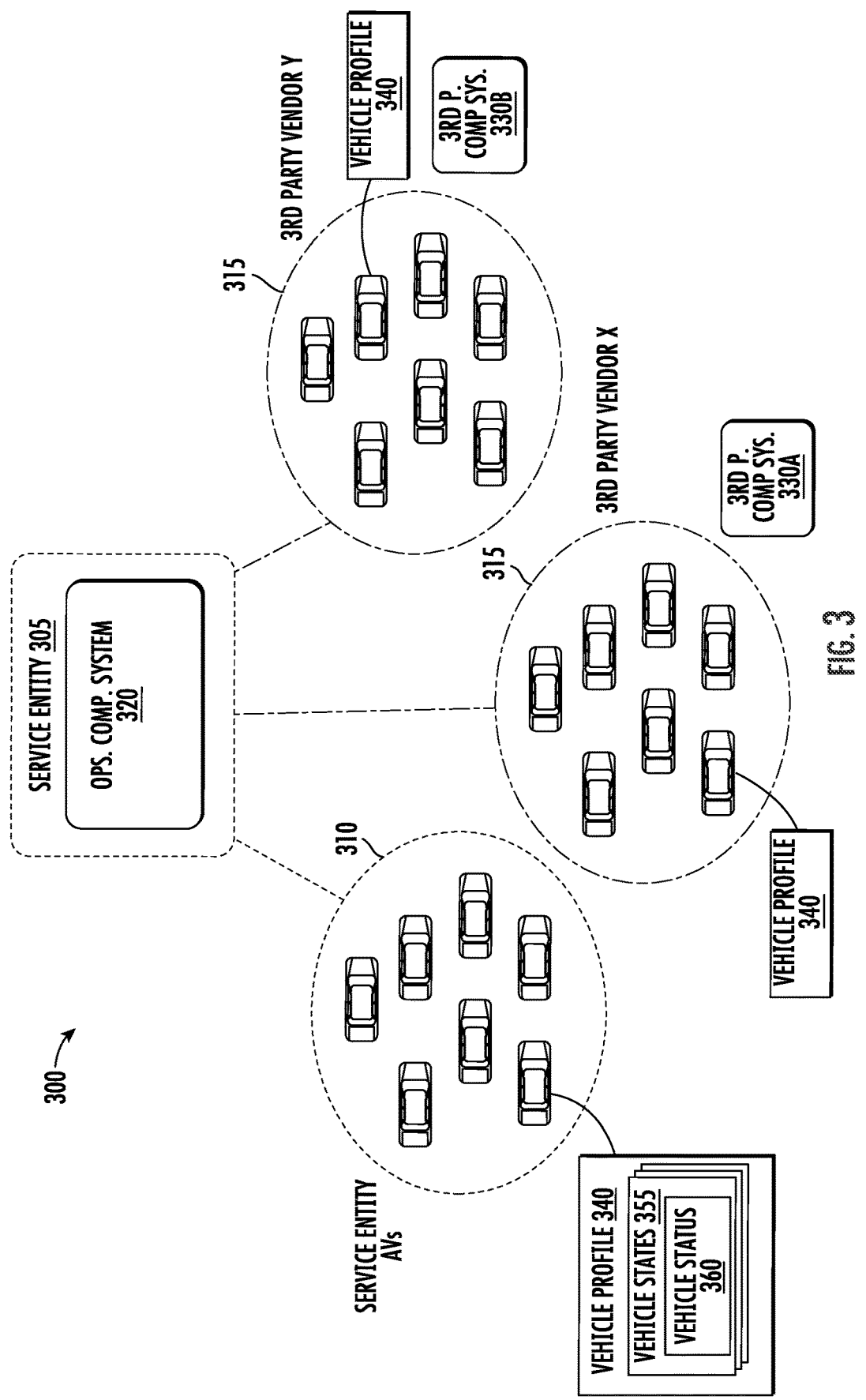
FIG. 3 depicts an example vehicle ecosystem according to example embodiments of the present disclosure.

For example, FIG. 3 depicts an example vehicle ecosystem 300 according to example embodiments of the present disclosure. The ecosystem 300 can include vehicles 310, 315 associated with one or more vehicle providers including, for example, the service entity 305, a third-party vehicle provider X associated with the vehicle provider X computing system 330A, a third-party vehicle provider Y associated with the vehicle provider Y computing system 330B, an individual (e.g., owning/leasing a human driven vehicle), etc. As discussed herein, the service entity 305 can utilize a plurality of vehicles including, but not limited to, service entity/first-party vehicles 310 and/or third-party vehicles 315 (e.g., third-party vehicle provider X autonomous vehicle, third-party vehicle provider Y autonomous vehicles, etc.) to provide vehicle services. A vehicle 310, 315 can be included in one or more fleets. A fleet can include one or a plurality of vehicles. The service entity 305 can be associated with a first computing system such as, for example, an operations computing system 320 (e.g., implementing the service infrastructure, service platform, etc.). The operations computing system 320 of the service entity 305 can help coordinate, support, manage, facilitate, etc. the provision of vehicle service(s) by the vehicles 310, 315. The service entity 305, vehicles 310, 315, and operations computing system 320 can include/represent the service entities, vehicles, and operations computing systems discussed with reference to one or more other figures described herein.

The vehicles 310, 315 can include human-driven and/or autonomous vehicles of a vehicle provider. As discussed herein, the vehicle providers can include the service entity (supplying "first-party autonomous vehicles" or "service entity autonomous vehicles") and/or one or more third-party vehicle providers (supplying "third-party autonomous vehicles"). The vehicle providers can make their fleets (or a portion of their fleets) of vehicles available (e.g., through the service entity 305, etc.) such that the vehicles are available for performing vehicle services (e.g., to address a user service request). A vehicle involved in a transportation service offered by the service entity 305 can include one of a plurality of autonomous vehicles (e.g., of the vehicle fleets 310, 315) associated with the service entity 305.

Each vehicle of the plurality of vehicles associated with the service entity 305 can be associated with a number of states 355 defined by a respective provider (e.g., service entity, third-party, etc.) of the vehicle. By way of example, the one or more service entity vehicles 310 can be associated with one or more vehicle states 355 configured by the service entity 305 and/or the one or more third-party vehicles 315 can be associated with one or more vehicle states 355 configured by a respective third-party entity. In some implementations, a computing system associated with the third-party entity can provide data indicative of the one or more vehicle states 355 to the service entity 305 (e.g., operations computing system 320) to help allow for implementation of the vehicle state service as described herein with respect to third-party vehicles 315.

Each vehicle state 355 can include a dynamic onboard-defined condition for a vehicle. More specifically, the vehicle state 355 can include a particular dynamic onboard-defined condition that a vehicle is in at a specific time. Each vehicle state 355 can include one or more different statuses 360 indicative of the value of the vehicle state 355 at the specific time. The vehicle status 360 of a vehicle state 355 can change over time due to one or more vehicle actions. A vehicle action can include an onboard vehicle action performed and/or initiated by a vehicle computing system of a respective vehicle (and/or a user of the vehicle). By way of example, a vehicle state 355 can include a door state. The door state can be changed between a locked status (e.g., representing a locked door) and an unlocked status (e.g., representing an unlocked door). A vehicle action such as, for example, a locking action can be initiated by a respective vehicle computing system to change the vehicle status 360 of the door state from the unlocked status to the locked status.

A vehicle state 355 can be configured for any dynamic, onboard-defined condition of a vehicle. As further examples, a vehicle state 355 can include a door state for each door, combination of doors, etc. of a vehicle, one or more engine states representing information (e.g., whether the engine is on, a current temperature of the engine, a working condition of the engine, etc.) associated with an engine of the vehicle, one or more routing states representing information (e.g., an onboard generated route, etc.) associated with a routing system (e.g., motion planning system, etc.) of the vehicle, one or more climate control states representing information (e.g., a current set temperature, etc.) associated with a climate control system of the vehicle, one or more entertainment states representing information (e.g., a current song playing, etc.) associated with an entertainment system of the vehicle, and/or any other states representing a dynamic condition of a vehicle. Each vehicle state 355 can be changed between one or more different statuses 360 such as, for example, a locked or unlocked status for the door state; an on, off, temperature range, etc. status for the engine state; a route status for the routing state; an environment condition status for the climate control state; an entertainment status for the entertainment state; etc.

By way of example, each vehicle 310, 315 associated with the service entity (e.g., service entity vehicles 310, third-party vehicles 315, etc.) can be associated with a corresponding vehicle profile 340. Each vehicle profile 340 can represent a current state of a vehicle associated with the service entity 305. For example, the current state can include a current status 360 of each of a plurality of different vehicle states 355 (e.g., associated with their respective vehicle component) for each vehicle associated with the service entity 305 (e.g., service entity vehicles 310, third-party vehicles 315, etc.). The vehicle profile 340 can identify a plurality of current statuses 360 for a plurality of vehicle states 355 of the vehicle. The plurality of current statuses 360 can include a current status for each vehicle state 355 associated with a respective vehicle (e.g., maintained by a respective vehicle provider). As discussed herein, the vehicle state 355 can include a dynamically defined (e.g., set to a number of different values (e.g., statuses) over time) state of the vehicle. The dynamically defined state can be set based, at least in part, on one or more vehicle actions.

As an example, the plurality of vehicle states 355 of the vehicle profile 340 can include one or more door states indicative of a door status at a specific time, one or more engine states indicative of an engine status at a specific time, one or more route states indicative of a route status at a specific time, one or more climate control states indicative of a climate control status at a specific time, and/or one or more entertainment system states indicative of an entertainment status at a specific time. The plurality of current statuses 360 for the plurality of vehicle states 355 can include at least one of the door status, engine status, route status, climate control status, or entertainment status. For example, the door status can identify whether a door is locked, the engine status can identify whether an engine is running, the route status can identify a route that the vehicle is performing, the climate control status can identify an environment condition (e.g., temperature, etc.) of an interior of the vehicle, and the entertainment status can identify an entertainment activity (e.g., a song, video, directions, etc.) presented by an entertainment system of the vehicle.

In some implementations, the plurality of vehicle states 355 can include one or more logical groupings. The one or more logical groupings can include one or more vehicle state categories as a top level categorization with one or more vehicle state domains within each of the vehicle state categories. The subfields of a vehicle state domain can describe attributes that are physically and/or logically close to each other, update in similar frequency (e.g., within a frequency time threshold, etc.), and/or can be consumed (e.g., retrieved) together by downstream systems. As one example, the vehicle state categories can include a hardware state category, motion state category, and/or a configuration state category. The hardware state category can include one or more vehicle states 355 associated with onboard hardware such as, for example, one or more door states, trunk states, seat states, engine states, communication system states, etc. The motion state category can include one or more vehicle states 355 associated with vehicle motion such as, for example, one or more vehicle intention states, autonomy states, odometry states, planned route states, etc. The configuration state category can include one or more vehicle states 355 associated with current onboard settings such as, for example, one or more entertainment system states, climate control states, etc.

Figure 4:
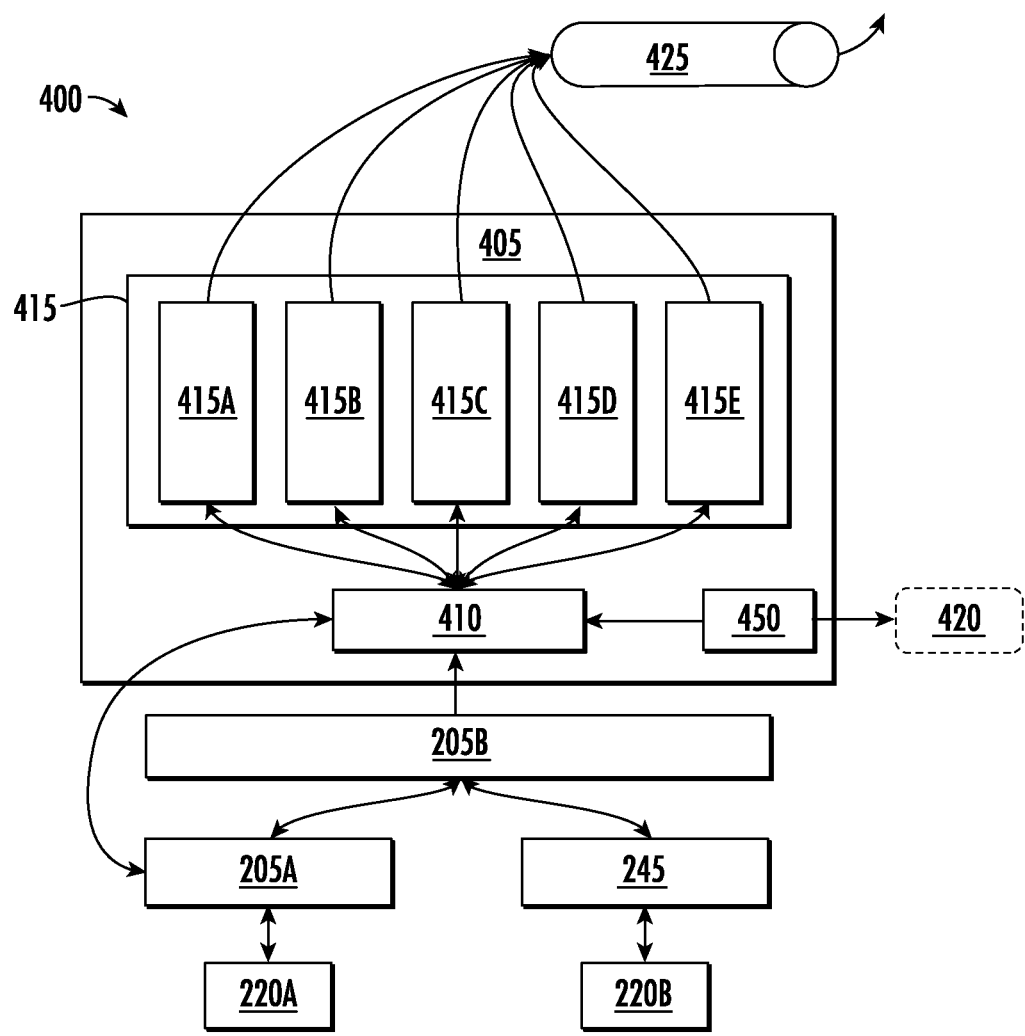
FIG. 4 depicts an example vehicle state service architecture according to example embodiments of the present disclosure.
Figure 5:
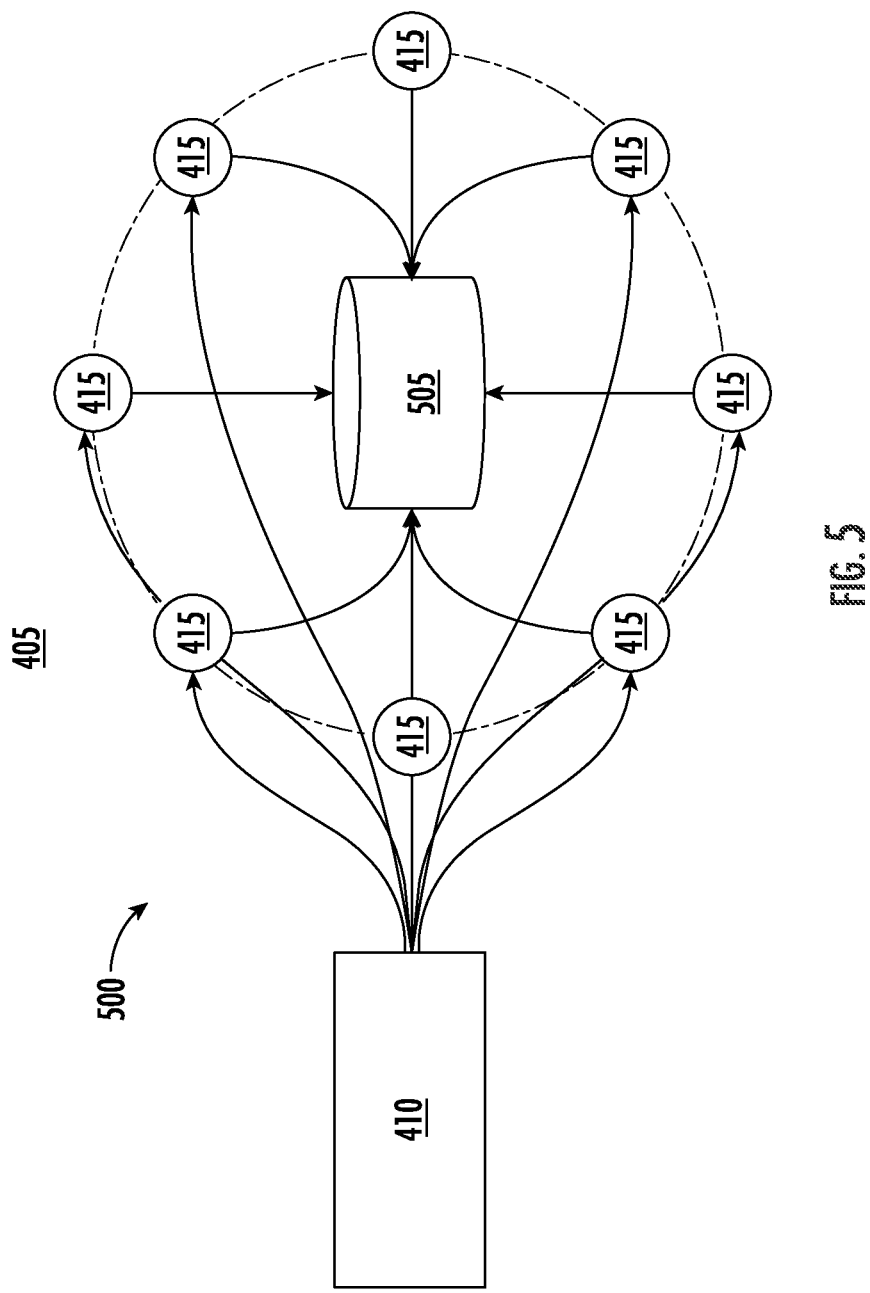
FIG. 5 depicts an example routing process according to example embodiments of the present disclosure.

FIG. 4 depicts an example vehicle state service architecture 400 according to example embodiments of the present disclosure. The vehicle state service architecture 400 can include a vehicle state service 405 in communication with the third-party interface platform 205B, the service entity interface platform 205A, and a distributed event stream 425. The third-party interface platform 205B can be configured to communicate with the service entity interface platform 205A and/or third-party vehicles 220B (e.g., via a respective third-party vehicle provider computing system 245) to facilitate the transfer of vehicle state information. The third-party interface platform 205B can be configured to interface with service entity vehicle(s) 220A and/or third-party vehicle(s) 220B to provide and/or receive state information to/from the vehicle(s) 220A, 220B. The service entity interface platform 205A can be configured to interface with vehicle(s) 220A to provide and/or receive state information to/from the vehicle(s) 220A.

The vehicle state service 405 can be configured to preserve and serve service provider specific and provider agnostic vehicle states and facilitate state mutating vehicle actions. To do so, the vehicle state service 405 can preserve (e.g., store, receive, maintain, etc.) vehicle profiles (e.g., vehicle profiles 340 of FIG. 3), accept updates (e.g., through one or more APIs, etc.) to the vehicle profiles, and serve the vehicle state data through exposed interfaces (e.g., a distributed event stream 425 such as, for example, a kafka/heatpipe topic, etc.). For example, a remote device 420 (e.g., a user device, a rider device, a service provider device, etc.) can interact with the vehicle state service 405 to request a vehicle state change (e.g., to unlock a door, to turn on an engine, etc.) for one or more vehicle(s) 220A, 220B via one or more vehicle actions. A vehicle action, for example, can include an onboard bound instruction that is intended to mutate a vehicle state. As an example, a vehicle action can include an unlock door action configured to change the door state to an unlocked door status, an open fuel door action to change a fuel door state to an open status, an adjust climate control temperature action to change the set temperature identified by a climate control status of the climate control state, and/or any other action intended to change the status of any vehicle state of a respective vehicle.

The vehicle state service 405 can include a gateway service 410 and one or more worker instances 415A-E. The gateway service 410 can be configured to route data between the one or more worker instances 415 of the vehicle state service 405 and the remote devices 420. For example, with reference to FIG. 5, the vehicle state service 405 can be configured with a stateful routing mechanism 500 configured to distribute a plurality of vehicle commands to change a vehicle state between one or more of the worker instances 415. Callers (e.g., remote device, user device, rider device, service provider device, etc.) of the vehicle state service 405 can interact with the gateway service 410 to provide a vehicle command. In some implementations, direct calls (e.g., a vehicle command) to an individual worker instance 415 can be prohibited. The plurality of vehicle commands can be evenly distributed across one or more gateway instances and, from there, routed statefully to individual worker instances 415.

As one example, the vehicle commands can be distributed according to an associated vehicle identifier. For instance, a vehicle command can be associated with an autonomous vehicle that is one of a plurality of autonomous vehicles (e.g., service entity vehicles, third-party vehicles, etc.) associated with the service entity. The vehicle command, for example, can include a vehicle identifier corresponding to the autonomous vehicle. In addition, each worker instance 415 can be associated with a subset of one or more of the plurality of vehicles. In such a case, the vehicle command can be routed to an individual worker instance 415 associated with a subset of vehicles including the vehicle associated with the vehicle command (e.g., identified by the vehicle identifier). By way of example, the vehicle state service 405 can identify, via the gateway service 410, a vehicle identifier associated with the vehicle command and assign, via the gateway service 410, a worker instance of the worker instance(s) 415 to the vehicle command based, at least in part, on the vehicle identifier. In this way, the vehicle commands for a respective vehicle can be synchronized (e.g., by a respective worker instance 415) with state change detection for the respective vehicle.

For instance, each worker instance 415 of the vehicle state service 405 can be configured to access a shared memory 505. FIG. 6, for example, depicts an example storage infrastructure 600 according to example embodiments of the present disclosure. As shared memory 505 can include a storage system including one or more memory devices. The storage system can include a two-tiered storage architecture. The two-tiered storage architecture can include a multi-level cache (e.g., a two level cache). The multi-level cache can include a two level cache including at least one distributed, in memory key-value database 605A, 605B.

More particularly, the multi-level cache can include a first level cache 605A, 605B and second level cache 610. The first level cache 605A, 605B can include a distributed, in memory key-value data structure such that it is highly performant and consistent with a datacenter. Underneath, a durable second level cache 610 can be configured to ensure the propagation of vehicle state data across a number of datacenters (e.g., associated with first level caches 605A, 605B). In this manner, the vehicle state data (e.g., vehicle profiles, etc.) can be protected from datacenter failover scenarios. As discussed in further detail below, for inbound vehicle state updates (e.g., in response to vehicle commands), quick diffing can be performed (e.g., by the worker instances 415) with the first level cache 605A, 605B. The worker instance 415 can compare a desired status of a vehicle command to a current status of the diffed vehicle profile (and/or vehicle state) to determine whether to update to the status of the vehicle state. The worker instance 415 can determine to update the status of the vehicle state in the event that the current status is different than the desired status for the vehicle state.

If an update is determined after diffing, the worker instance 415 can update (e.g., after receiving a vehicle response as described herein) the first and second level cache 605A-B, 610 in serial. In some implementations, an inbound handler can respond after an update to the first level cache 605A, 605B is complete, and monitor update failures to the second level cache 610. In addition, or alternatively, the inboard handler can include a time to live threshold (e.g., minute, hour, eight hours, etc.) for the first level cache 605A, 605B to minimize effects of the first and second level caches 605A-B, 610 being out of sync. For inbound current state requests (e.g., request to obtain the current status of a vehicle state), the worker instance 415 can attempt to look up requested vehicle state from the level one cache 605A, 605B. In the event the requested vehicle state (e.g., of the respective vehicle profile) is not found, the worker instance 415 can attempt to warm up the level one cache 605A, 605B with data fetched from the level two cache 610 and attempt to fulfill the current state request.

For example, turning back to FIG. 4, the vehicle state service 405 can obtain a vehicle command 450 from a remote computing device 420. The remote computing device 420 can include a user device (e.g., user device 130 of FIG. 1), a vehicle device (e.g., vehicle computing system 110, etc.), a vehicle provider device (e.g., of vehicle provider computing system(s) 245), a vehicle operator device (e.g., associated with an operator of a vehicle, etc.), and/or any other device associated with a vehicle. For instance, the remote computing device 420 can be associated with a transportation service. By way of example, the remote device 420 can include one or more user device(s) associated with a rider of the autonomous vehicle (e.g., for a transportation service), maintenance device(s) associated with the servicing of the autonomous vehicle (e.g., to prepare for a transportation service), service provider systems/devices (e.g., to provide a transportation service), and/or any other device associated with a transportation service.

The remote device 420 can provide a vehicle command 450 to the vehicle state service 405 to request a vehicle state change for an autonomous vehicle. For example, the vehicle command 450 can be associated with a vehicle state of the autonomous vehicle. The vehicle command 450 can include a desired status for the vehicle state. The vehicle command 450 can include a request to change a current status of a vehicle state to the desired status.

In some implementations, the vehicle command 450 can be associated with a command type. For example, the command type can include at least one of a first (e.g., service entity) command type and/or a second (e.g., provider agnostic) command type. The command type can correspond to a vehicle state and/or vehicle action associated with the vehicle command 450. By way of example, the vehicle state(s) can include one or more first vehicle states of a first type (e.g., service entity type) and/or one or more second vehicle states of a second type (e.g., provider agnostic type). The second vehicle state(s) can include a common set of vehicle states that can be updated and retrieved by service entity vehicles 220A and third-party vehicles 220B. The first vehicle state(s) can include a set of vehicle states that can be updated and retrieved by service entity vehicles 220A and/or one or more other groups of vehicles, but not every vehicle (e.g., service entity vehicles 220A and third-party vehicles 220B) associated with the service entity.

In some implementations, the vehicle states can be defined by one or more vehicle state application programming interface(s) (APIs) based, at least in part, on the vehicle state type. For example, the vehicle state API(s) can include at least a first (e.g., service entity) and second (e.g., provider agnostic) vehicle state API. The first vehicle state API, for example, can include a portion of and/or be associated with the first vehicle API of the service entity interface platform 205A. The second vehicle state API can include a portion of and/or be associated with the second vehicle API of the third-party interface platform 205B.

By way of example, the first vehicle state API can include a service entity vehicle state API that defines private vehicle states for service entity vehicles 220A. In addition, or alternatively, the second vehicle state API can include a provider agnostic vehicle state API that defines public vehicle states for both service entity vehicles 220A and third-party vehicles 220B. Each vehicle state can be defined by a respective application programming interface based on the vehicle state type. By way of example, the first vehicle state(s) can be defined by the first vehicle state API and the second vehicle state(s) can be defined by the second vehicle state API.

In some implementations, the first vehicle state API can be directly accessible to one or more service entity vehicles 220A via the service entity interface platform 205A. In addition, or alternatively, the second vehicle state API can be accessible to service entity vehicles 220A, via the service entity interface platform 205A, and third-party vehicles 220B, via the vehicle provider computing system(s) 245, as proxied by the third-party interface platform 205B. For example, the third-party interface platform 205B can be configured to proxy communications (e.g., calls to the second vehicle state API) between the vehicle state service 405 and the vehicles 220A, 220B.

By way of example, the first and second vehicle state APIs can be associated with one or more respective get and update APIs defining functions to obtain (e.g., via the get API) or set (e.g., via the update API) a current status of a vehicle state. In some implementations, the respective get and update APIs can be grouped by vehicle state category (e.g., one or more API directories for vehicle states of each vehicle state category). The get and update APIs can define one or more messages to obtain or set a status of a first or second vehicle state. For example, first (e.g., service entity) get and update APIs can define one or more messages to obtain or set a status of the first vehicle state(s), whereas second (e.g., provider agnostic) get and update APIs can define one or more messages to obtain or set a status of the second vehicle state(s). In some implementations, remote devices 420 (and/or the vehicle state service 405) can interact with a respective get and/or update API (e.g., call a function of, etc.) to obtain or set a current status of a respective vehicle state.

A service entity vehicle 220A can be accessible via one or more calls to the first (e.g., service entity) application programming interfaces or the second (e.g., provider agnostic) application programming interfaces. A third-party vehicle 220B can be accessible via one or more calls to the second (e.g., provider agnostic) application programming interface. A vehicle state type of a vehicle state can be promoted (e.g., from a first vehicle state to a second vehicle state) or demoted (e.g., from a second vehicle state to a first vehicle state) by moving the location of the vehicle state definition. For example, a first vehicle state can be promoted to a second vehicle state by appending the respective vehicle state definition to the second vehicle state API and/or removing the definition from the first vehicle state API. In this manner, the multiple APIs can enable the promotion and/or demotion (and/or the corresponding accessibility) of a plurality of vehicle states with small code changes (e.g., to consume from a different path for the same definition).

In some implementations, the vehicle actions (e.g., an action by a vehicle to change a vehicle state of the vehicle) can include one or more first vehicle actions of a first type (e.g., service entity type) and/or one or more second vehicle actions of a second type (e.g., provider agnostic type). The second vehicle action(s) can correspond to a second vehicle state such that the second vehicle action(s) can be issued to both service entity and third-party vehicles 220A, 220B, whereas the first vehicle action(s) can correspond to a first vehicle state such that the first vehicle action(s) can be issued to service entity vehicles 220A and/or one or more other groups of vehicles, but not every vehicle (e.g., service entity vehicles 220A and third-party vehicles 220B) associated with the service entity.

The vehicle actions can be defined by a vehicle action API. Each vehicle action can include a command subroutine to initiate a vehicle action (e.g., by interacting with an autonomous vehicle computing system) and a corresponding update subroutine to update an associated vehicle state (e.g., based on the success of the command subroutine). The vehicle action API can be configured to interact with the first and/or second application programming interfaces. For instance, the command and/or update subroutines can include one or more calls to at least one of the first (e.g., service entity) application programming interface(s) or the second (provider agnostic) application programming interface(s).

A vehicle command 450 can be associated with a command type. The command type can include a first command type or a second command type. The first command type can be associated with a first vehicle action, defined by the action API, that includes at least one call to the first (e.g., service entity) APIs, for example, to initiate a state change to at least one first vehicle state. In addition, or alternatively, the second command type can be associated with a second vehicle action, defined by the action API, that includes at least one call to the second (e.g., provider agnostic) APIs, for example, to initiate a state change to at least one second vehicle state. The type of a vehicle action and/or vehicle command 450 can be modifiable by changing a location of the at least one call corresponding to the action/command. In this manner, each vehicle action defined by the vehicle action API and/or corresponding vehicle command 450 can be associated with at least one of the first or second application programming interfaces.

The vehicle state service 405 can determine whether the desired status for the vehicle state is different than a current status of the vehicle state. For example, as described herein, each vehicle of the plurality of vehicles 220A, 220B can be associated with a corresponding vehicle profile (e.g., vehicle profile 340 of FIG. 3) describing the current state of the vehicle. The current status of the vehicle state of the autonomous vehicle associated with the vehicle command 450 can be stored in the vehicle profile associated with the autonomous vehicle. The vehicle state service 405 can obtain the vehicle profile associated with the autonomous vehicle to compare the desired status of the vehicle state to the current status of the vehicle state.

By way of example, the vehicle state service 405 (e.g., a worker instance 415 of the vehicle state service 405) can be configured to access the vehicle profile from a shared memory (e.g., the two level cache described with reference to FIG. 5) based, at least in part, on the vehicle identifier associated with the vehicle command 450. The vehicle state service 405 (e.g., worker instance 415) can obtain the vehicle profile from the shared memory. The vehicle state service 405 (e.g., worker instance 415) can compare the desired status of the vehicle command to the current status of the vehicle state (e.g., as represented by the vehicle profile) to determine whether to update to the vehicle status of the vehicle state. The vehicle state service 405 (e.g., worker instance 415) can determine to update the status of the vehicle state in the event that the current status is different than the desired status for the vehicle state.

The vehicle state service 405 can determine that the desired status for the vehicle state is different than the current status of the vehicle state. In response, the vehicle state service 405 (e.g., via the gateway service 410) can provide data indicative of the vehicle command 450 to a vehicle computing system associated with the autonomous vehicle. In some implementations, the data indicative of the vehicle command 450 can be provided to the vehicle via the one or more application programming interfaces. For example, as described herein, the vehicle command 450 can be associated with at least one command type corresponding to at least one call to a first (e.g., service entity) or second (e.g., provider agnostic) application programming interface. The command type of the vehicle command 450 (e.g., the associated vehicle action) can correspond to at least one of the application programming interfaces based, at least in part, on the vehicle state and/or vehicle action associated with the vehicle command 450.

By way of example, the vehicle command 450 can correspond to a respective vehicle action defined by the vehicle action API. The respective vehicle action can include one or more calls to at least one of the first or second vehicle state APIs, for example, to change a first or second vehicle state. As discussed herein, each API can include a plurality of calls of a certain type. For instance, the first (e.g., service entity) API can include a plurality of calls of a first (e.g., service entity) type. Each of the calls can be associated with a first vehicle action, as defined by the vehicle action API, that corresponds to a vehicle command 450 of a first command type. The second (e.g., provider agnostic) API can include a plurality of calls of a second (e.g., provider agnostic) type. Each of the calls can be associated with a second vehicle action, as defined by the vehicle action API, that corresponds to a vehicle command 450 of a second command type.

In some implementations, a service entity vehicle 220A can be accessible via one or more calls to the first (e.g., service entity) or second (e.g., provider agnostic) APIs. In addition, or alternately, a third-party vehicle 220B can be accessible via one or more calls to the second (e.g., provider agnostic) API. In such a case, the vehicle state service 405 can determine an application programming interface for providing the command (and/or data thereof) to the vehicle computing system based on the command type. The vehicle state service 405 can provide, via the respective application programming interface, the data indicative of the vehicle command 450 to the vehicle computing system. For example, the vehicle state service 405 can provide the data indicative of the vehicle command 450, via one or more calls to the first application programming interface(s), directly to a device (e.g., vehicle computing system, service entity platform device, etc.) associated with a service entity vehicle 220A in the event that the vehicle command 450 is a first (e.g., service entity) command type. In addition, or alternatively, the vehicle state service 405 can provide the data indicative of the vehicle command 450, via one or more calls to the second application programming interface(s), to a device (e.g., vehicle computing system, service entity platform device, third-party platform device, etc.) associated with the service entity and/or third-party vehicle 220A, 220B through a backend gateway platform (e.g., third-party interface platform 205B) in the event that the vehicle command 450 is a second (e.g., provider agnostic) command type.

The autonomous vehicle 220A, 220B (e.g., vehicle computing device, etc.) can obtain the data indicative of the vehicle command 450. In response, the vehicle 220A, 220B can initiate an action to change the vehicle status of the vehicle state to the desired status. For example, a vehicle computing system can provide one or more onboard instructions to one or more onboard components (e.g., door, entertainment system, engine, etc.) of the vehicle to initiate a requested state change. This can include, for example, providing one or more instructions to a door component to initiate a door locking action to lock a door of the vehicle, one or more instructions to an engine component to initiate an off action to turn off the engine, etc. After the action is completed, the autonomous vehicle (e.g., and/or vehicle computing system thereof) can provide a command response indicative of the updated vehicle status (e.g., the performance of the requested vehicle action, etc.) to the vehicle state service 405.

The vehicle state service 405 can obtain the command response indicative of the updated vehicle status for the vehicle state. In response, the vehicle state service 405 can update the current status of the respective vehicle state (e.g., of the respective vehicle profile 340) based on the command response. For instance, the command response can identify an updated status of the vehicle state. In such a case, the vehicle state service 405 can update the current status of the respective vehicle state to the update status of the vehicle state. In this manner, the vehicle state service 405 can wait for a confirmation of a vehicle state change from the vehicle before updating the current status of the vehicle state.

In some implementations, a call to a vehicle action from the vehicle action APIs may not be guaranteed to be deterministic. For example, a caller (e.g., vehicle state service) may not assume a pre-state of a vehicle action's targeting vehicle state (e.g., due to latency, etc.). In addition, the caller (e.g., vehicle state service) may not assume the targeting vehicle will perform the vehicle action effectively. Thus, in order to increase security and verify the effectiveness of a vehicle action, vehicle commands issued to a vehicle can include a request for a vehicle command response. The command response can include an indication of a clear success or failure of the requested vehicle actions that signals the effectiveness of the requested vehicle action.

For example, FIGS. 7A-E depict example vehicle action sequences according to example embodiments of the present disclosure. FIGS. 7A-E each depict a sequence of state service events 791 and first remote device events 792 over time 790. In addition, FIGS. 7D-E include second remote device events 793.

Figure 7A:
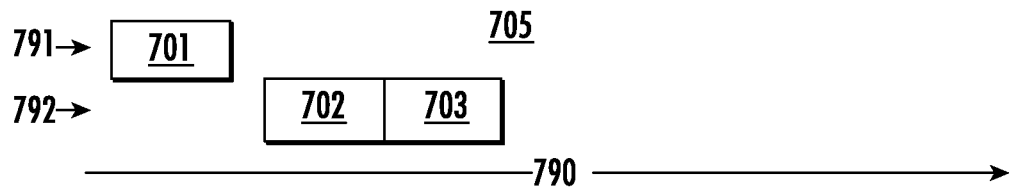
FIGS. 7A-E depict example vehicle action sequences according to example embodiments of the present disclosure.

FIG. 7A depicts a scenario 705 in which a vehicle command is associated with a vehicle action 702 to set a current vehicle status 701 (as represented by a vehicle profile stored offboard an autonomous vehicle) to another desired vehicle status. In scenario 705, a vehicle command including a desired vehicle status for a vehicle state that is the same as the current vehicle status can immediately result in a successful command response (e.g., because no action is required). For example, vehicle action 702 can be initiated from the remote device by issuing a vehicle command and a state service response 703 can be immediately received from the vehicle state service.

Figure 7B:
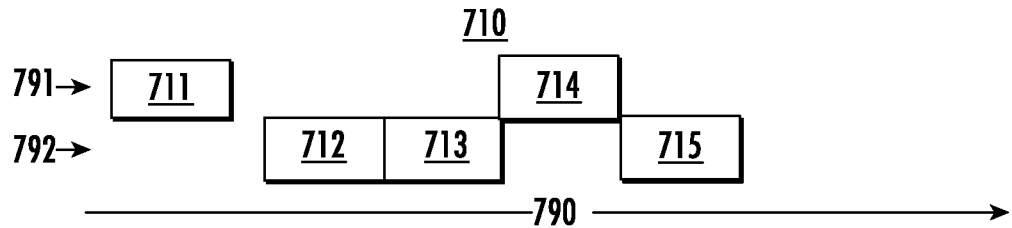

FIG. 7B depicts another scenario 710 in which a vehicle command including a desired vehicle status different than the current vehicle status 711 can result in a success after the desired status is reflected onboard the vehicle (e.g., as indicated by a command response 714). For example, the vehicle action 712 can be initiated from the remote device issuing a vehicle command to the vehicle state service. The vehicle state service can provide data indicative of the vehicle command to the vehicle and wait (at 713) for a command response 714 from the vehicle. In response to receiving the command response 714, the vehicle state service can provide the state service response 715 to the remote device. In this manner, the vehicle state service can verify that a command has been completed before sending a response 715 to the remote device.

Figure 7C:
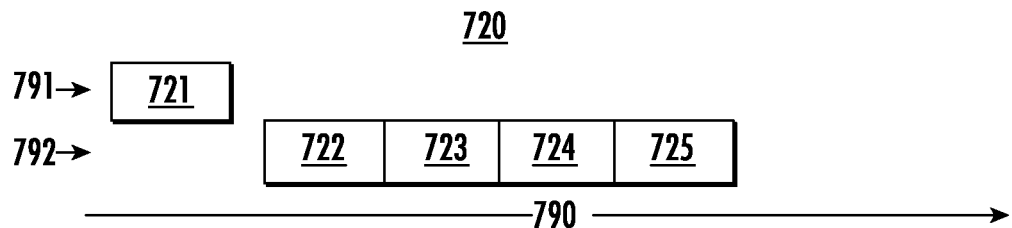

FIG. 7C depicts another scenario 720 in which a vehicle command including a desired vehicle status different than the current vehicle status 721 can result in an error response 725 after a time threshold elapses 724 without the desired status being reflected on/offboard (e.g., by receiving a successful command response). For example, the vehicle action 722 can be initiated from the remote device issuing a vehicle command to the vehicle state service. The vehicle state service can provide data indicative of the vehicle command to the vehicle and wait (at 723) for a command response from the vehicle. In response to detecting that the time threshold has elapsed (at 724), the vehicle state service can provide the state service response 725 to the remote device.

In the case of multiple competing vehicle commands, API calls (e.g., calls to a vehicle action API) may only respond based on the next immediate state change such that the vehicle action API is immediate outcome-oriented. In this manner, multiple vehicle commands aiming to set the vehicle status of a vehicle to a same status can result in success after the desired status is reflected on/offboard (e.g., by a command response to at least one of the vehicle commands).

Figure 7D:
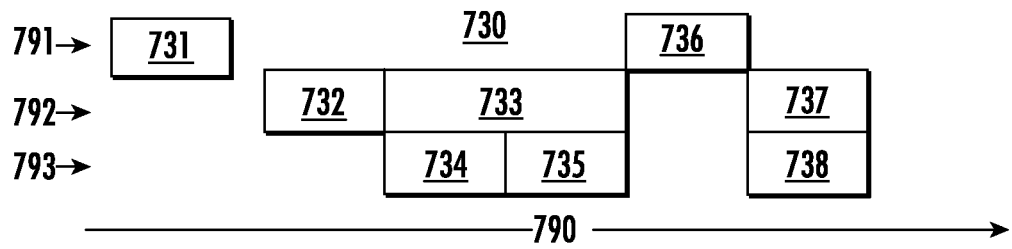

For example, FIG. 7D depicts a scenario 730 in which two vehicle commands and including the same desired vehicle status that is different than the current vehicle status 731 can result in a success after the desired status is reflected onboard the vehicle (e.g., as indicated by a command response 736). For example, the vehicle actions 732, 734 can be initiated from different remote devices at different times by issuing vehicle commands to the vehicle state service. The vehicle state service can provide data indicative of the vehicle commands to the vehicle and wait (at 733 and 735) for a command response 736 from the vehicle. In response to receiving the command response 736, the vehicle state service can provide the state service response 737 to the first remote device and state service response 738 to the second remote device.

Figure 7E:
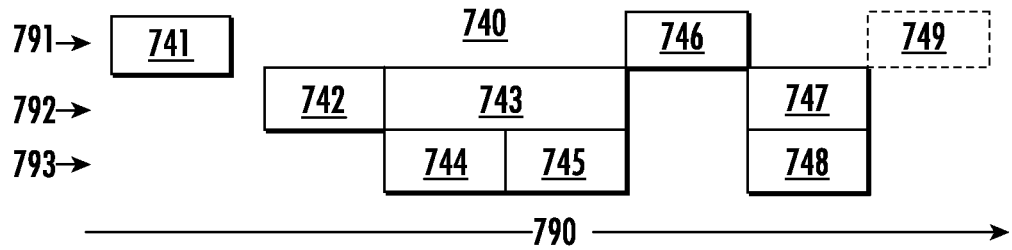

As yet another example, multiple vehicle commands that aim to set a vehicle state to one or more different values can result in success or failure based on the immediate state change detected offboard. For instance, FIG. 7E depicts a scenario 740 in which two vehicle commands and including different desired vehicle statuses that are different than (and/or the same as) the current vehicle status 741 can result in at least one successful response 747 and/or at least one error response 748. For example, the vehicle actions 742, 744 can be initiated from different remote devices at different times by issuing vehicle commands to the vehicle state service. The vehicle state service can provide data indicative of the vehicle commands to the vehicle and wait (at 743 and 745) for a command response 746 from the vehicle. The command response 746 can identify a new current status 749 for the vehicle state. In response to receiving the command response 746, the vehicle state service can provide a successful response 747 to the first remote device that issued the first command including the new current status 749 and an error response 748 to the second remote device that issued the second command not including the new current status 749. In this way, the desired status of the first command can be reflected as the new current status 749 of the vehicle state.

Turning back to FIG. 4, the vehicle state service 405 can generate an update event indicative of the vehicle state and the updated current status. The update event can be published to the distributed event stream 425 (e.g., a kafka/heatpipe topic, etc.). For example, the worker instance 415 can be configured to publish the update event to the distributed event stream 425 in response to the command response. A vehicle state message (e.g., indicative of the update event) can be streamed through the distributed event stream 425. In some implementations, the distributed event stream 425 can include one or more topics. In such a case, the distributed event stream 425 can include at least one topic for each vehicle state domain (e.g., described with reference to FIG. 3). Each topic can include both first and second vehicle states (e.g., as defined by the first (e.g., service entity) and second (provider agnostic) APIs).

One or more devices can be subscribed to the distributed event stream 425 to receive data indicative of an update event for one or more of the vehicles 220A, 220B. By way of example, the one or more devices subscribed to the distributed event stream 425 can include at least one of a user device, a service entity device, a vehicle provider device, and/or any other device associated with an on-demand transportation service. The distributed event stream 425 can be configured to fire on-update. In this manner, each of the subscribed devices can receive event-based notifications of a change in a vehicle state. In some implementations, updates to the first and second vehicle states can be divided between separate sub-messages. In this way, the consumers (e.g., subscribed devices) can subscribe to receive vehicle state changes for specific types of vehicle state(s) (e.g., service entity type states and/or provider agnostic type states) of a domain without having to manage multiple subscriptions.

Figure 8:
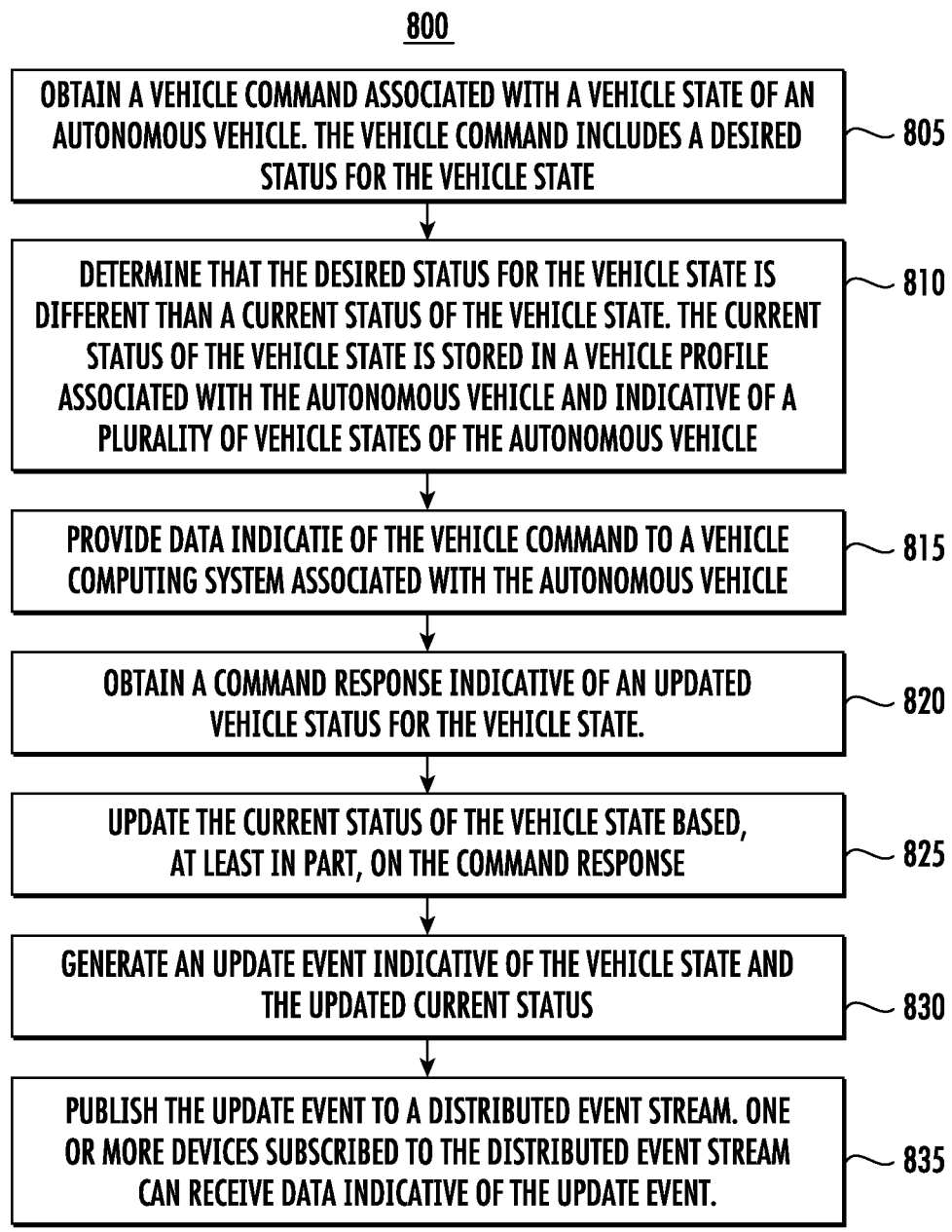
FIG. 8 depicts a flow diagram of an example method for filtering requests according to example embodiments of the present disclosure.

FIG. 8 depicts a flow diagram of an example method 800 for autonomous vehicle state management according to example embodiments of the present disclosure. One or more portion(s) of the method 800 can be implemented by a computing system that includes one or more computing devices such as, for example, the computing systems described with reference to the other figures (e.g., operations computing system 190A, the backend system 210, vehicle state service 405, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-6, 9-10, etc.), for example, to facilitate vehicle state changes. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining a vehicle command associated with a vehicle state of an autonomous vehicle. For example, a computing system (e.g., operations computing system 102, backend system 210, vehicle state service 405, etc.) can obtain the vehicle command associated with the vehicle state of the autonomous vehicle. The vehicle command can include a desired status for the vehicle state.

At 810, the method 800 can include determining that the desired status for the vehicle state is different than a current status of the vehicle state. For example, the computing system (e.g., operations computing system 102, backend system 210, vehicle state service 405, etc.) can determine that the desired status for the vehicle state is different than the current status of the vehicle state. The current status of the vehicle state can be stored in a vehicle profile associated with the autonomous vehicle and can be indicative of a plurality of vehicle states of the autonomous vehicle.

At 815, the method 800 can include providing data indicative of the vehicle command to a vehicle computing system associated with the autonomous vehicle. For example, the computing system (e.g., operations computing system 102, backend system 210, vehicle state service 405, etc.) can provide data indicative of the vehicle command to the vehicle computing system associated with the autonomous vehicle.

At 820, the method 800 can include obtaining a command response indicative of an updated vehicle status for the vehicle state. For example, the computing system (e.g., operations computing system 102, backend system 210, vehicle state service 405, etc.) can obtain the command response indicative of the updated vehicle status for the vehicle state.

At 825, the method 800 can include updating the current status of the vehicle state based, at least in part, on the command response. For example, the computing system (e.g., operations computing system 102, backend system 210, vehicle state service 405, etc.) can update the current status of the vehicle state based, at least in part, on the command response.

At 830, the method 800 can include generating an update event indicative of the vehicle state and the updated current status. For example, the computing system (e.g., operations computing system 102, backend system 210, vehicle state service 405, etc.) can generate the update event indicative of the vehicle state and the updated current status.

At 835, the method 800 can include publishing the update event to a distributed event stream. For example, the computing system (e.g., operations computing system 102, backend system 210, vehicle state service 405, etc.) can publish the update event to the distributed event stream. One or more devices subscribed to the distributed event stream can receive data indicative of the update event.

Figure 9:
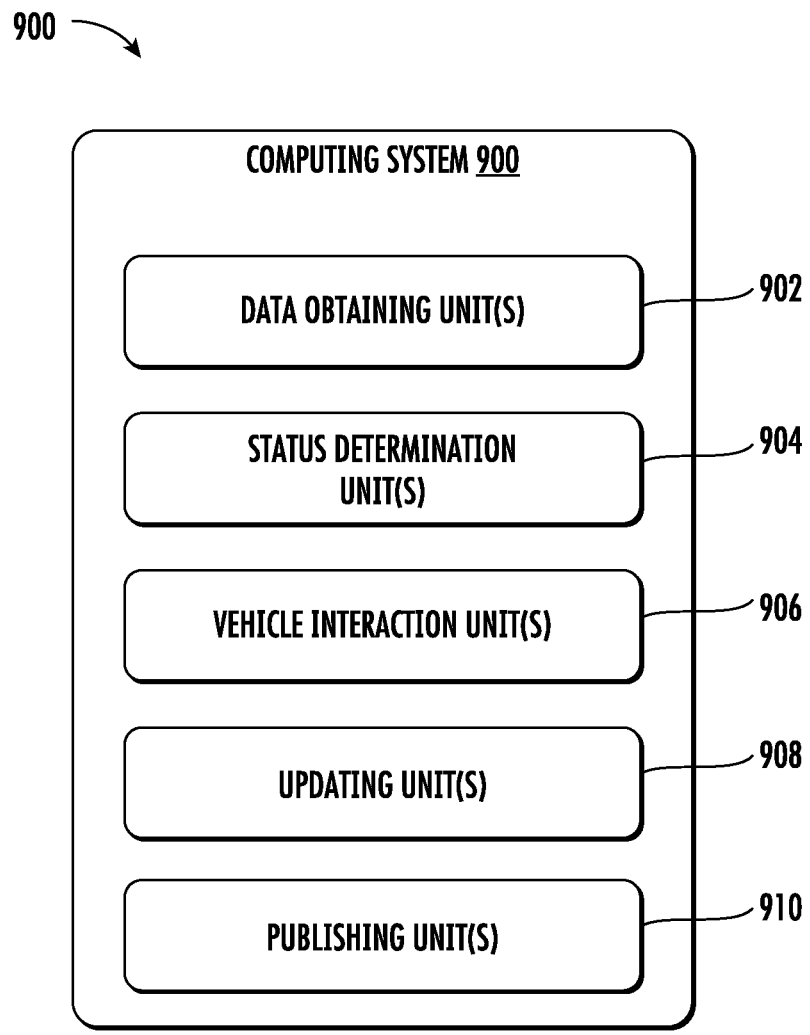
FIG. 9 depicts example units associated with a computing system for performing operations and functions according to example embodiments of the present disclosure.

Various means can be configured to perform the methods and processes described herein. For example, FIG. 9 depicts example units associated with a computing system for performing operations and functions according to example embodiments of the present disclosure. FIG. 9 depicts a computing system 900 that can include, but is not limited to, data obtaining unit(s) 902; status determination unit(s) 904; vehicle interaction unit(s) 906; updating unit(s) 908; and publishing unit(s) 910. In some implementations one or more units may be implemented separately. In some implementations, one or more units may be included in one or more other units.

In some implementations, one or more of the units may be implemented separately. In some implementations, one or more units may be a part of or included in one or more other units. The means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means (e.g., data obtaining unit(s) 902, etc.) can be configured to obtain a vehicle command associated with a vehicle state of an autonomous vehicle. The vehicle command can include a desired status for the vehicle state. The means (e.g., status determination unit(s) 904, etc.) can be configured to determine that the desired status for the vehicle state is different than a current status of the vehicle state. The current status of the vehicle state, for example, can be stored in a vehicle profile associated with the autonomous vehicle. The vehicle profile can be indicative of a plurality of vehicle states of the autonomous vehicle.

The means (e.g., vehicle interaction unit(s) 906, etc.) can be configured to provide data indicative of the vehicle command to a vehicle computing system associated with the autonomous vehicle. In addition, or alternatively, the means (e.g., vehicle interaction unit(s) 906, etc.) can be configured to obtain a command response indicative of an updated vehicle status for the vehicle state. The means (e.g., updating unit(s) 908, etc.) can be configured to update the current status of the vehicle state based, at least in part, on the command response. In addition, or alternatively, the means (e.g., updating unit(s) 908, etc.) can be configured to generate an update event indicative of the vehicle state and the updated current status. The means (e.g., publishing unit(s) 910, etc.) can be configured to publish the update event to a distributed event stream. One or more devices subscribed to the distributed event stream can receive data indicative of the update event.

Figure 10:
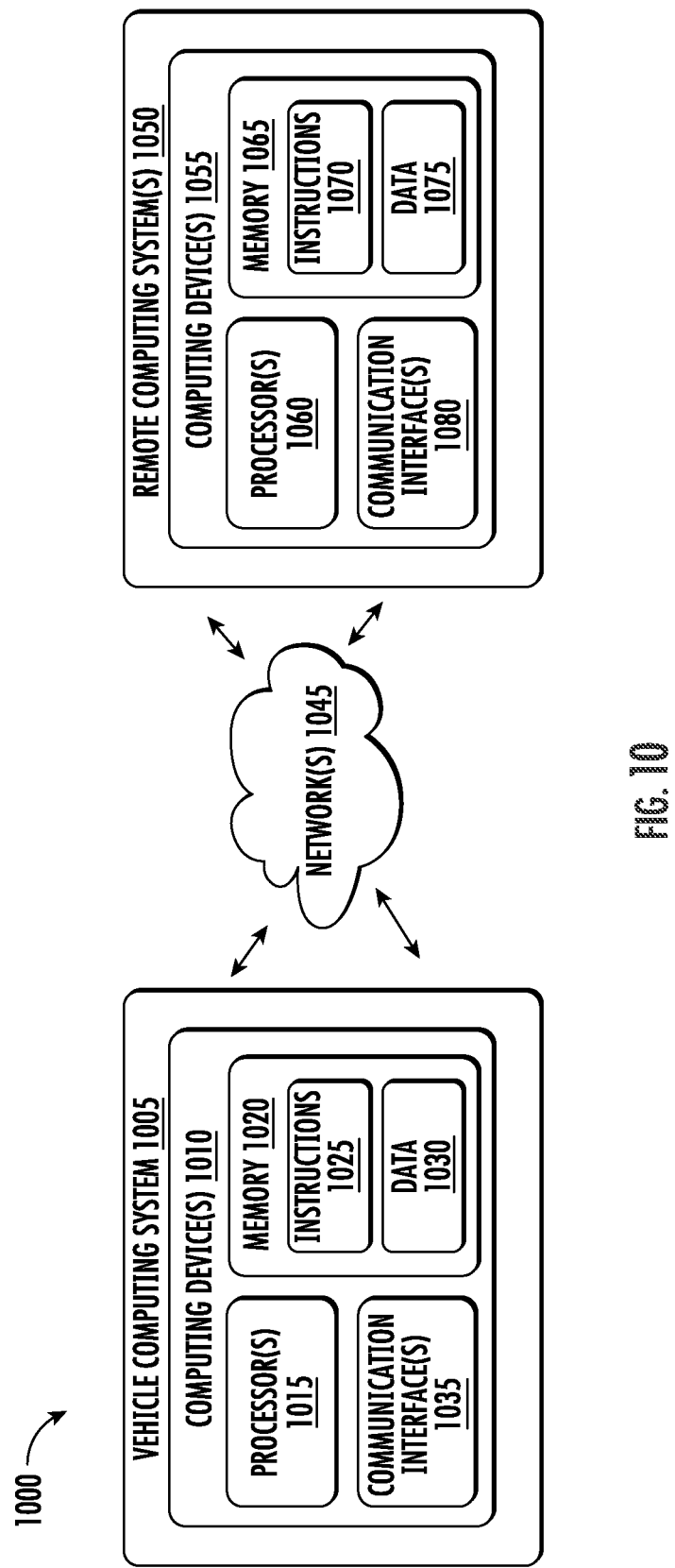
FIG. 10 depicts a block diagram of an example computing system according to example embodiments of the present disclosure.

FIG. 10 depicts example system components of an example system 1000 according to example embodiments of the present disclosure. The example system 1000 can include the computing system 1005 (e.g., vehicle computing system 112, one or more vehicle devices, etc.) and the computing system 1050 (e.g., operations computing system 104, remote computing devices 106, backend system 210, vehicle state service 405, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions of or for which the computing systems described herein are configured.

The memory 1020 can store data 1030 that can be obtained, received, accessed, written, manipulated, created, and/or stored. The data 1030 can include, for instance, vehicle state data, action data, command data, sensor data, response data, etc. as described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, vehicle profiles, command data, response data, and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at an operations computing system can instead be performed remote from the operations computing system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
   obtaining, by a computing system comprising one or more computing devices, a vehicle command associated with a vehicle state of an autonomous vehicle, wherein the vehicle command comprises a desired status for the vehicle state;
   determining, by the computing system, that the desired status for the vehicle state is different than a current status of the vehicle state, wherein the current status of the vehicle state is stored in a vehicle profile associated with the autonomous vehicle, the vehicle profile indicative of a plurality of vehicle states of the autonomous vehicle;
   providing, by the computing system, data indicative of the vehicle command to a vehicle computing system associated with the autonomous vehicle;
   obtaining, by the computing system, a command response indicative of an updated vehicle status for the vehicle state;
   updating, by the computing system, the current status of the vehicle state based, at least in part, on the command response;
   generating, by the computing system, an update event indicative of the vehicle state and the updated current status; and
   publishing, by the computing system, the update event to a distributed event stream, wherein a plurality of devices subscribed to the distributed event stream receive data indicative of the update event, the publishing comprising publishing a first sub-message to a first portion of the plurality of devices and publishing a second sub-message to a second portion of the plurality of devices, the first sub-message describing a change to a first vehicle state of the plurality of vehicle states having a first vehicle state type, the second sub-message describing a change to a second vehicle state of the plurality of vehicle states having a second vehicle state type different than the first vehicle state type.

2. The computer-implemented method of claim 1, wherein the vehicle state comprises a dynamically defined state of the autonomous vehicle, the dynamically defined state defined based, at least in part, on one or more vehicle actions.

3. The computer-implemented method of claim 1, wherein the plurality of vehicle states comprise one or more door states indicative of a door status, one or more engine states indicative of an engine status, one or more route states indicative of a route status, one or more climate control states indicative of a climate control status, or one or more entertainment system states indicative of an entertainment status.

4. The computer-implemented method of claim 3, wherein each vehicle state of the plurality of vehicle states is associated with a current status, wherein the current status comprises at least one of the door status, engine status, route status, climate control status, or entertainment status, wherein the door status identifies whether a door is locked, the engine status identifies whether an engine is running, the route status identifies a route for the autonomous vehicle, the climate control status identifies an environment condition of an interior of the autonomous vehicle, and the entertainment status identifies an entertainment activity presented by an entertainment system of the autonomous vehicle.

5. The computer-implemented method of claim 1, wherein the vehicle command is associated with a command type, the command type comprising at least one of a first command type or a second command type.

6. The computer-implemented method of claim 5, wherein providing the data indicative of the vehicle command to the vehicle computing system associated with the autonomous vehicle comprises:
   determining, by the computing system, an application programming interface for providing the data indicative of the vehicle command to the vehicle computing system based, at least in part, on the command type; and
   providing, by the computing system via the application programming interface, the data indicative of the vehicle command to the vehicle computing system.

7. The computer-implemented method of claim 6, wherein the application programming interface comprises at least one of a first application programming interface associated with one or more vehicle commands of a first command type or a second application programming interface associated with one or more vehicle commands of a second command type.

8. The computer-implemented method of claim 7, wherein the autonomous vehicle comprises at least one of a service entity vehicle or a third-party vehicle, wherein the service entity vehicle is accessible via one or more calls to the first application programming interface or the second application programming interface, and wherein the third-party vehicle is accessible via one or more calls to the second application programming interface.

9. The computer-implemented method of claim 7, wherein the vehicle command corresponds to at least one call to the first application programming interface or the second application programming interface, wherein the command type of the vehicle command is modifiable by changing a location of the at least one call.

10. The computer-implemented method of claim 1, wherein the plurality of devices subscribed to the distributed event stream comprise at least one of a user device, a service entity device, or a vehicle provider device associated with an on-demand transportation service.

11. A computing system, comprising:
   one or more processors; and
   one or more tangible, non-transitory, computer readable media that collectively store instructions that when executed by the one or more processors cause the computing system to perform operations, the operations comprising:
   obtaining, via a state service from a remote device, a vehicle command associated with a vehicle state of an autonomous vehicle, wherein the vehicle command comprises a desired status for the vehicle state;
   determining, via the state service, that the desired status for the vehicle state is different than a current status of the vehicle state, wherein the current status of the vehicle state is stored in a vehicle profile associated with the autonomous vehicle, the vehicle profile indicative of a plurality of vehicle states of the autonomous vehicle;
   providing, via the state service, data indicative of the vehicle command to a vehicle computing system associated with the autonomous vehicle;
   obtaining, via the state service, a command response indicative of an updated vehicle status for the vehicle state;
   updating, via the state service, the current status of the vehicle state based, at least in part, on the command response;
   generating, via the state service, an update event indicative of the vehicle state and the updated current status; and
   publishing, via the state service, the update event to a distributed event stream, wherein a plurality of devices subscribed to the distributed event stream are configured to receive data indicative of the update event, the publishing comprising publishing a first sub-message to a first portion of the plurality of devices and publishing a second sub-message to a second portion of the plurality of devices, the first sub-message describing a change to a first vehicle state of the plurality of vehicle states having a first vehicle state type, the second sub-message describing a change to a second vehicle state of the plurality of vehicle states having a second vehicle state type different than the first vehicle state type.

12. The computing system of claim 11, wherein the state service comprises a gateway service and one or more worker instances, wherein the operations further comprise:
   identifying, via the gateway service, a vehicle identifier associated with the vehicle command, the vehicle identifier corresponding to the autonomous vehicle; and
   assigning, via the gateway service, a worker instance of the one or more worker instances to the vehicle command based, at least in part, on the vehicle identifier.

13. The computing system of claim 12, wherein the gateway service is configured to route data between the one or more worker instances and the remote device.

14. The computing system of claim 12, wherein the autonomous vehicle is one of a plurality of autonomous vehicles associated with a transportation service entity, and wherein each worker instance of the one or more worker instances is associated with a subset of one or more of the plurality of autonomous vehicles.

15. The computing system of claim 12, wherein the worker instance is configured to access the vehicle profile from a two level cache based, at least in part, on vehicle identifier.

16. The computing system of claim 15, wherein the two level cache comprises at least one distributed, in-memory key-value database.

17. The computing system of claim 13, wherein the worker instance is configured to publish the update event to the distributed event stream in response to the command response.

18. One or more tangible, non-transitory computer-readable media storing computer-readable instructions that when executed by one or more processors cause the one or more processors to perform operations, the operations comprising:
   obtaining a vehicle command associated with a vehicle state of an autonomous vehicle of a plurality of autonomous vehicles associated with a transportation service entity, wherein the vehicle command comprises a desired status for the vehicle state, wherein the vehicle state comprises a dynamic onboard-defined condition for the autonomous vehicle;
   determining that the desired status for the vehicle state is different than a current status of the vehicle state, wherein the current status of the vehicle state is stored in a vehicle profile associated with the autonomous vehicle, the vehicle profile indicative of a plurality of vehicle states of the autonomous vehicle;

providing data indicative of the vehicle command to a vehicle computing system associated with the autonomous vehicle;

obtaining a command response indicative of an updated vehicle status for the vehicle state;

updating the current status of the vehicle state based, at least in part, on the command response;

generating an update event indicative of the vehicle state and the updated current status; and publishing the update event to a distributed event stream, wherein a plurality of devices subscribed to the distributed event stream are configured to receive data indicative of the update event, the publishing comprising publishing a first sub-message to a first portion of the plurality of devices and publishing a second sub-message to a second portion of the plurality of devices, the first sub-message describing a change to a first vehicle state of the plurality of vehicle states having a first vehicle state type, the second sub-message describing a change to a second vehicle state of the plurality of vehicle states having a second vehicle state type different than the first vehicle state type.

19. The one or more tangible, non-transitory computer-readable media of claim 18, wherein the plurality of autonomous vehicles associated with the transportation service entity comprise one or more service entity vehicles operated by the transportation service entity and one or more third-party vehicles operated by a third-party entity.

20. The one or more tangible, non-transitory computer-readable media of claim 19, wherein one or more update events associated with the one or more service entity vehicles and the one or more update events associated with the one or more third-party vehicles are published to the distributed event stream.

\* \* \* \* \*